(12) United States Patent
Stöckli et al.

(10) Patent No.: US 10,248,136 B2
(45) Date of Patent: Apr. 2, 2019

(54) FLOW REGULATOR AS WELL AS METHOD FOR SETTING A PREDEFINABLE VOLUME FLOW

(71) Applicant: Levitronix GmbH, Zürich (CH)

(72) Inventors: Simon Stöckli, Zürich (CH); Andreas Kalapos, Zürich (CH); Patrick Zentner, Zürich (CH); Jürg Burkart, Rudolfstetten (CH)

(73) Assignee: LEVITRONIX GMBH, Zurich (CH)

( * ) Notice: Subject to any disclaimer, the term of this patent is extended or adjusted under 35 U.S.C. 154(b) by 479 days.

(21) Appl. No.: 14/979,644

(22) Filed: Dec. 28, 2015

(65) Prior Publication Data

US 2016/0202707 A1 Jul. 14, 2016

Related U.S. Application Data

(60) Provisional application No. 62/101,785, filed on Jan. 9, 2015.

(51) Int. Cl.
*G05D 7/06* (2006.01)
*F04B 49/06* (2006.01)

(52) U.S. Cl.
CPC ......... *G05D 7/0635* (2013.01); *F04B 49/065* (2013.01); *G05D 7/0676* (2013.01); *G05D 7/0682* (2013.01)

(58) Field of Classification Search
CPC .. G05D 7/0635; G05D 7/0676; G05D 7/0682; F04B 49/065

(Continued)

(56) References Cited

U.S. PATENT DOCUMENTS

| 2007/0215639 | A1* | 9/2007 | Roberts | B67D 7/0238 |
| | | | | 222/61 |
| 2014/0261824 | A1* | 9/2014 | Byers | B24B 57/02 |
| | | | | 137/896 |
| 2016/0166755 | A1* | 6/2016 | Golarits | F04B 49/065 |
| | | | | 417/53 |

FOREIGN PATENT DOCUMENTS

| EP | 0888827 A2 | 1/1999 |
| EP | 0953749 A2 | 11/1999 |

OTHER PUBLICATIONS

Extended European Search Report dated Jul. 4, 2016 in EP Patent Application No. 15156586.8.

(Continued)

*Primary Examiner* — Robert A Cassity
(74) *Attorney, Agent, or Firm* — Global IP Counselors, LLP

(57) ABSTRACT

A flow regulator includes a first sensor determining a first actual value of a first flow parameter of the fluid, a pre-pressure regulator setting a predefinable pre-pressure at a pre-pressure outlet of the pre-pressure regulator, and a regulating pump. The fluid is capable of being supplied to the pre-pressure regulator at a plant pressure in an operating state via an inflow line and a pre-pressure inlet and capable of being conducted further to the regulating pump at the pre-pressure via a flow connection disposed between the pre-pressure outlet and the regulating pump, the pre-pressure outlet being connected to a high pressure connection of the regulating pump in a flow communicating manner via the flow connection such that the fluid is capable of being supplied from the pre-pressure regulator of the regulating pump and guided away from the regulating pump via a low pressure connection into an outflow line.

20 Claims, 15 Drawing Sheets

(58) Field of Classification Search
USPC .......................................................... 700/282
See application file for complete search history.

(56) References Cited

OTHER PUBLICATIONS

Paresh Girdhar, et al., "Practical Centrifugal Pumps", XP055283963, Jan. 1, 2004, p. 107.

* cited by examiner

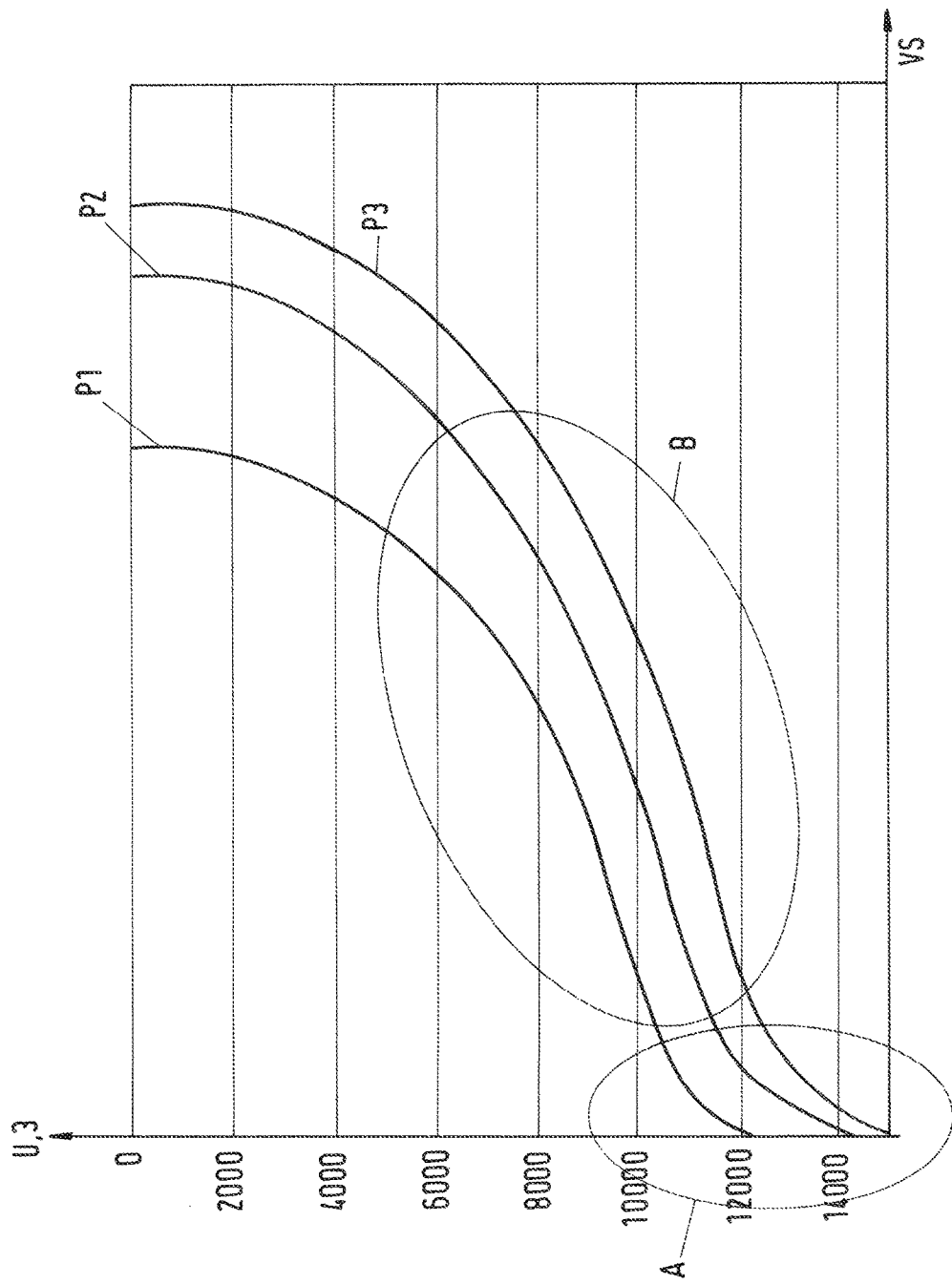

FLOW REGULATOR AS WELL AS METHOD FOR SETTING A PREDEFINABLE VOLUME FLOW

CROSS-REFERENCE TO RELATED APPLICATIONS

This application claims priority to U.S. Provisional Application No. 62/101,785, filed Jan. 9, 2015, the contents of which is hereby incorporated herein by reference.

FIELD OF THE INVENTION

The invention relates to a flow regulator as well as to a method for setting a predefinable volume flow in a flow system.

BACKGROUND OF THE INVENTION

Flow regulators for setting a predefinable volume flow in a flow system are well known in the state of the art in many variants of design. A frequently used configuration in the state of the art is schematically illustrated for a better understanding of the invention with reference to the FIG. 1. For differentiating the present invention from the solutions known from the state of the art the reference numerals for the already known solutions in accordance with FIGS. 1-2 are respectively provided with a prime, whereas the reference numerals that relate to features of embodiments in accordance with the invention in accordance with FIGS. 3A-8D do not bear a prime.

The known arrangement of a flow regulator 1' for setting a predefinable volume flow VS' of a fluid F' in a flow system 100' comprises a sensor SF1' in the form of a through-flow sensor SF1' for determining an actual value IW1' of a fluid flow KF1' of the fluid F'. The flow regulator 1' further comprises a pre-pressure regulator 2' for setting a predefinable pre-pressure PV' at a pre-pressure outlet 22' of the pre-pressure regulator 2', as well as a regulating pump 3', wherein the fluid F' can be supplied to the pre-pressure regulator 2' in the operating state via an inflow line 20' and a pre-pressure inlet 21' and can be conducted further to the regulating pump 3' at the pre-pressure PV' via a flow connection 4' provided between the pre-pressure outlet 22' and the regulating pump 3'. The pre-pressure outlet 22' is connected to a low pressure connection 32' of the regulating pump 3' in a flow communicating manner via the flow connection 4' in such a way that the fluid F' can be supplied from the pre-pressure regulator 2' of the regulating pump 3' and can be conducted away again from the regulating pump 3' via a high-pressure connection 31' into an outflow line 5'. In dependence on the first actual value IW1' of the fluid flow KF1', a speed of rotations of the regulating pump 3' can be set by means of a not explicitly illustrated regulating control on use of a desired value SW1' and/or on use of a speed of rotations desired value DI' of the regulating pump 3' in such a way that an amplification pressure PVST' cooperating with the pre-pressure PV' in a like manner can be produced by means of the regulating pump 3' in such a way that the predefinable value flow VS' of the fluid F' can be set in the outflow line 5'.

The fluid F' is in this connection supplied in the operating state to the inflow line 20' at the plant pressure PA', wherein the plant pressure PA' in practice is frequently more or less subjected to significant pressure and/or through-flow variations that should be regulated by the flow regulator 1' in an as good as possible manner over a wide range and/or the volume flow VS' should be set such that the desired predefined volume flow VS' is present in the outflow line 5'.

SUMMARY

In this connection a whole series of further embodiments of flow regulators 1' are known in practice, for example those in which the sensor SF1' is a pressure sensor SF1' and/or in which a plurality of sensors are possibly also provided at different positions of the flow path. The pre-pressure regulator 2' is in this connection a pressure reducing unit and can in particular be a manual pressure regulator, a pneumatic pressure regulator, an electric pressure regulator, a proportional valve or a different suitable pressure reducing unit.

For example a blocking valve SOV' or a hydraulic limiting element HB' can optionally frequently be provided in this connection in accordance with FIG. 1, whose function is well known to the person of ordinary skill in the art and also almost plays no role in the understanding of the present invention.

An essential problem of the known flow regulator 1' such as is schematically illustrated by way of example with reference to FIG. 1 and having regard to the state of the art, consists therein that the pre-pressure regulators 2' are frequently passive pre-pressure regulators 2' and which when taken in isolation essentially put a P regulator into practice.

Such a known passive pre-pressure regulator 2' is schematically illustrated with reference to the FIG. 2.

In this connection it should explicitly be noted that the pre-pressure regulator 2' in accordance with FIG. 2 can in a particularly preferred way also be provided at a flow regulator 1 in accordance with the invention according to FIGS. 3A-8D, as the flow regulator 1 in accordance with the invention after all, amongst other things, reliably remedies the disadvantages brought about by the known pre-pressure regulators 2' for the first time, this will be illustrated in detail in the following in the framework of the detailed description of the invention.

The pre-pressure regulator 2' known per se in accordance with FIG. 2 whose illustration should be understood merely schematically and by way of example for all known pre-pressure regulators of this or similar kind, is in particular exemplary for all P regulators and in the present example is designed as a P regulator, comprises a housing G' having a control chamber SK' and a regulating chamber RK'. The fluid F' is supplied to the control chamber SK' via the pre-pressure inlet 21' at the plant pressure PA', with a regulating piston K' preloaded by a pressure spring F' being provided within the control chamber SK'. As can clearly be seen in the FIG. 2, the regulating piston K' is effectively connected via a regulating rod RS' to an elastic membrane M' in such a way that the regulating piston K' can be positioned with respect to the spring force of the pressure spring F' by means of a predefinable regulating force RKR' acting on the membrane M' such that an effective through-flow surface FEF' of the control chamber SK' can be set in such a way that the pre-pressure PV' and/or the through-flow of the fluid F' at the pre-pressure outlet 22' can be set to the predefinable volume flow VS'. The control chamber SK' in this way essentially forms a control and a regulating throttle. If the regulating force RKR' is increased then the pre-pressure PV' becomes larger, if the regulating force RKR' is reduced, then the effective through-flow surface FEF' and the pre-pressure PV' likewise also reduce in a corresponding manner.

The volume flow VS' is, amongst other things, respectively substantially the same in the complete flow system and indeed before and after the pre-pressure regulator 2' in as far as the fluid F' is a substantially incompressible liquid, such as e.g. water, oil, a slurry, blood or a different substantially incompressible liquid.

Such a proportional regulator (P regulator) has a series of disadvantages, as has been known to the person of ordinary skill in the art for a long time. As a pure P regulator the regulator, besides a possibly present hysteresis of the membrane M', has no memory. This means as a pure P regulator the regulator always reacts to the current input parameters (regulating force RKR') without considering the previous history of the regulating path or the speed of the regulating deviations. This means that as a pure P regulator it has no integral portion and no differential portion.

Moreover, the membrane M', with respect to its bending behavior, frequently has a more or less strongly pronounced hysteresis in the pressure progression, in such a way that for an exactly equal regulating force RKR' it is not ensured that the exact same force always acts on the regulating piston K' and/or on the pressure spring F'. As the bending behavior of the membrane M' is subjected to a hysteresis it can e.g. occur that the membrane M' is subjected to a certain inherent tension in dependence on the previous history, the inherent tension e.g. compensating a part of the regulating force RKR' or adding to this depending on which direction the remaining inherent tension of the membrane M' acts. This naturally has a very negative effect, in particular on regulating very small volume flows VS' and/or very small pre-pressures PV', as in particular in this example small deviations in the force acting on the regulating piston K' could consequently lead to comparatively large deviations of the volume flow VS'.

A further grave disadvantage well known to the person skilled in the art and associated with the just discussed problem is that the pre-pressure regulator 2' of the FIG. 2 has a resolution that becomes worse for small volume flows VS' and/or for small introduced plant pressures PA', the smaller the set volume flow VS' and/or the smaller the plant pressure PA' present at the pre-pressure inlet 21' is. Besides this such passive regulators always have certain deviations in regulation over the complete regulation range as the person of ordinary skill in the art knows.

This and further disadvantages known to the person of ordinary skill in the art naturally negatively influence the regulating behavior of the known flow regulator 1' composed of pre-pressure regulator 2' and regulating pump 3'. In this connection not only the pre-pressure regulator 2' is solely responsible for the disadvantages of the known flow regulator 1'. Also the assembly in accordance with FIG. 1 includes certain disadvantages that cannot be avoided in principle by such an arrangement.

Thus, for example, as already mentioned, the volume flow VS' can only be regulated with large uncertainties for correspondingly small volume flows VS' and/or for correspondingly small plant pressures PA' and in the worst case can no longer be regulated at all for very small volume flows VS' or for very small plant pressures PA'. Also the pre-pressure PV' and/or the volume flow VS' cannot be regulated to exactly zero. In particular, the flow direction of the volume flow VS' can naturally also not be reversed.

The reasons for this are actually clear. The regulating pump 3' can principally only increase the volume flow VS' and not reduce this, as this can only further increase the pressure in the same way as the pre-pressure PV'. This means that the larger the speed of rotations of the regulating pump 3' is, the larger the volume flow VS' can be increased up to a certain maximum possible value. If in contrast to this, the speed of rotations of the regulating pump 3' is further reduced, then the volume flow VS' is amplified less and less up until it is no longer amplified on a standstill of the pump and then depends only on the plant pressure PA' and/or on the setting and the influence of the pre-pressure regulator.

When correspondingly small volume flows VS' should be set, the regulating behavior of the known flow regulator 1' in accordance with FIG. 1 is thus increasingly dominated solely by the pre-pressure regulator 2' and in this way also by the above described disadvantages.

But also for volume flows VS' that are not too small and not too large, this means those that lie somewhere in a medium regulating range, the known flow regulator 1' has disadvantageous properties. Thus, it can only react in an insufficient way, in particular on fast deviations, in particular also on deviations up to larger volume flows VS', as the regulating pump 3' can only react to suddenly increasing volume flows VS' and/or to suddenly increasing pre-pressure PV' thereby that the speed of rotations of the regulating pump 3' is reduced, this means that the amplification of the volume flow VS' is weakened by the regulating pump 3'. However, the regulating pump 3' cannot actively reduce the volume flow VS' and/or the pre-pressure PV'. This leads to a more or less non-linear regulating behavior and frequently to an at least slightly instable regulating behavior of the known flow regulator 1', in particular in the range of medium sized volume flows VS', this means for volume flows VS' that are neither close to zero nor close to the upper boundary of maximum volume flows VS'.

In conclusion the known flow regulator 1' in accordance with FIG. 1, in particular for the regulating ranges particularly relevant for practice, namely in the range of small volume flows VS' and/or small plant pressures PA', as well as in the mean regulating range, in which the flow systems to be regulated are operated most of the time in practice have significant disadvantages, which are of principle nature and which cannot be remedied e.g. by simple adaptation and/or alignment measures.

For this reason it is the object of the invention to make available a flow regulator in which the disadvantages of the flow regulators known from the state of the art are remedied. Which, in particular also at small volume flows or at a small pre-pressure, ensures a sufficiently reliable regulating behavior of the volume flow in a flow system and with which, in particular the volume flow can also be regulated to precisely zero. Moreover, it should additionally also be possible to reverse the flow direction of the volume flow in the flow system and to ensure, also for volume flows of medium size, a reliable and/or substantially linear regulating behavior. Moreover, the possibility should be made available to retrofit already existing flow systems through the exchange of a few components to a flow system in accordance with the invention in such a way that existing plants do not necessarily have to be completely or partly renewed in order to utilize the advantages of the new flow regulator in accordance with the invention. In this connection the flow regulator should be configured in specific cases such that also the volume flow of chemically or physically highly aggressively liquids or e.g. of biologically or medically highly sensitive liquid or also the volume flow of highly pure liquids can be regulated without a problem, without the flow regulator negatively influencing such liquids.

The subject matter of the invention satisfying this object from a process engineering point of view and from an apparatus point of view is characterized by the features discussed herein.

Additional advantageous embodiments of the invention are further discussed herein.

In accordance with the invention a flow regulator for setting a predefinable volume flow of a fluid, comprising a first sensor for determining a first actual value of a first flow parameter of the fluid, a pre-pressure regulator for setting a predefinable pre-pressure at a pre-pressure outlet of the pre-pressure regulator, as well as a regulating pump in the form of a rotary pump is thus suggested. The fluid can in this respect be supplied in the operating state at a plant pressure to the pre-pressure regulator via an inflow line and a pre-pressure inlet and can be conducted further via a flow connection provided between the pre-pressure outlet and the regulating pump to the regulating pump. In accordance with the invention, the pre-pressure outlet is connected to a high pressure connection of the regulating pump in a flow communicating manner via the flow connection in such a way that the fluid can be supplied from the pre-pressure regulator of the regulating pump and can be conducted way again from the regulating pump via a low pressure connection into an outflow line, wherein a speed of rotations of the regulating pump can be set by means of a regulating control on use of a first desired value in dependence on the first actual value of the first flow parameter in such a way that a limiting pressure acting against the pre-pressure can be produced by the regulating pump, so that the pre-definable volume flow of the fluid can be set in the outflow line.

It is essential for the invention that the pre-pressure outlet of the pre-pressure regulator is connected to the high pressure connection of the regulating pump in a flow communicating manner via the flow connection so that the fluid can be supplied from the pre-pressure regulator to the high pressure connection and not to the low pressure connection of the regulating pump. This means that the regulating pump does not work like in the state of the art, as an amplification means for increasing the volume flow and/or for increasing the pre-pressure, but the regulating pump in the operating state produces a limiting pressure acting against the pre-pressure, such that the predefinable volume flow of the fluid can be set in the outflow line, in that the volume flow is reduced by the regulating pump and, is not increased like in the state in the art. For this reason the fluid is preferably already supplied at an increased inlet pressure and/or plant pressure to the flow regulator in accordance with the invention and/or to the flow regulator, in particular the regulating pump and/or the pre-pressure regulator are correspondingly designed for these requirements. Or expressed in a simple manner, the regulating pump pumps against the volume flow coming from the pre-pressure regulator and not together with the volume flow as is the case for the flow regulators known from the state of the art.

It is thereby made possible for the first time, to sufficiently reliably ensure a regulating behavior of the volume flow in a flow system, in particular also for small volume flows or for a small pre-pressure, wherein the volume flow can even be regulated to sufficiently close to zero and it is moreover principally even possible, if required, to reverse the flow direction of the volume flow in the flow system. However, also for volume flows of medium size a reliable and/or a substantially linear regulating behavior can be ensured through the use of a flow regulator in accordance with the invention.

Moreover, in principle the possibility exists to retrofit existing flow systems simply to a flow system in accordance with the invention by a reverseal of the regulating pump or through the exchange of the regulating pump by a different suitable regulating pump that can be operated in the counter-flow mode of operation in accordance with the invention in such a way that existing plants do not have to be completely renewed in order to utilize the advantages of the new flow regulator in accordance with the invention. It is understood that in this case the regulating control must possibly correspondingly be adapted in practice, in some cases must likewise be replaced.

This is not least also possible because possibly negative properties of the pre-pressure regulator can be compensated as far as possible through the use of the regulating pump in accordance with the invention. Alternatively, having regard to a flow regulator in accordance with the invention, the properties of the pre-pressure regulator are less relevant than for a flow regulator known from the state of the art, as for a flow regulator in accordance with the invention the volume flow is not only stabilized more reliably, but can be stabilized faster to the predefined desired value. This is precisely because the regulating pump pumps against the volume flow and thus a system is established of two process parameters acting against one another that can be stabilized better to a predefined desired value to be stabilized. The mentioned process parameters acting against one another are in this connection the volume flow generated by the plant pressure flowing into the flow regulator which is counteracted by the regulating pump through the limiting pressure and does not cooperate with this.

This amongst other things also means that a flow regulator in accordance with the invention not only works more reliably and more exactly, but can also be assembled in a more simple manner and can be made available more cost-effectively, as, for example, very simple pre-pressure regulators, for example simple mechanical P regulators can be used and in this way the necessity for the use of frequently very expensive electronic PI or PID regulators does not exist, which are not only expensive, but frequently are also more sensitive to inference than robust, mechanical P regulators of simple design.

As will be explained in the following in more detail, a completely magnetically stored rotary pump can preferably be used in practice as a regulating pump by means of which the volume flow of chemically or physically highly aggressive liquids or e.g. of biologically or medically highly sensitive liquids or also the volume flow of highly pure liquids can be regulated in a particularly advantageous manner without a problem without the flow regulator negatively influencing such liquids.

Having regard to a preferred embodiment of a flow regulator in accordance with the invention, the first sensor is a through-flow sensor and the first flow parameter characterizes a fluid flow of the fluid, wherein in a different embodiment additionally or alternatively the first sensor is a pressure sensor and the first flow parameter characterizes a first fluid pressure in the fluid. Or expressed more simply, the regulating pump can, in particular e.g. on use of a pressure sensor or on use of a through-flow sensor or under some circumstances, also be controlled and/or regulated on use of a different suitable sensor; wherein in practice a possibly suitable calibration with respect to the measurement parameters of the sensor is required which, however, generally does not provide the person of ordinary skill in the art with any particular difficulties.

In this connection the first sensor, for example, can be provided downstream of the low pressure connection of the regulating pump at the outflow line and/or the first sensor can naturally also be provided e.g. at the flow connection between the pre-pressure regulator and the regulating pump. Some possible variants of the arrangement of the sensors for practice will be explained in the following in more detail by way of example with reference to the drawings.

Depending on the requirement, an additional pump can further be provided e.g. at the outflow line, in particular a rotary pump serving a pressure increase can be provided as a booster pump, by means of which the volume flow of the fluid can be further increased insofar that this becomes necessary. The booster pump can, however, also be arranged e.g. in front of the pre-pressure regulator such that the plant pressure can be supplied at an increased pressure with respect to the pressure regulator via the pre-pressure inlet, whereby not only the volume flow can be increased, but under some circumstances also the regulating character can be further improved.

For a further improvement of the regulating characteristics of a flow regulator of the present invention, at least one second sensor can be provided arranged downstream of the additional pump in the outflow line for the determination of a second actual value of a second flow parameter of the fluid in such a way that a speed of rotations of the additional pump can be controlled and/or regulated by means of an additional control, possibly on use of a second desired value, in dependence on the second actual value of the second flow parameter in such a way that the predefinable volume flow of the fluid can be set in the outflow line. In this connection the second sensor can, for example, be a second through-flow sensor and for setting the volume flow, the regulating control and the additional control can be connected in parallel to the second through-flow sensor in a signal conducting manner for reading in the second actual value, wherein the regulating control and the additional control can be fed in parallel with a common desired value.

In a further embodiment the second sensor can be a second pressure sensor and for setting the volume flow, the regulating control and the additional control can be connected to the second pressure sensor in parallel in a signal conducting manner for reading in the second actual value so that the regulating control and the additional control can be fed in parallel with the common desired value.

For setting the pre-pressure the pre-pressure regulator can, for example, be an active or a passive pre-pressure regulator, in particular however also an active pre-pressure regulator influenced by the first sensor and/or by the second sensor. In this connection the pre-pressure sensor can also be provided at the inflow line and/or at the flow connection and/or at the outflow line and can be connected to the active pre-pressure regulator in a signal conducting manner in such a way that the pre-pressure can be actively set.

As is generally known from the state of the art, the pre-pressure regulator can in practice be a pressure reducing unit, in particular a manual pressure regulator, a pneumatic pressure regulator, an electric pressure regulator, a proportional valve or a different suitable pressure reducing unit.

Although a regulating pump of a flow regulator in accordance with the invention can in principle be realized with any arbitrary rotary pump, a particular class of rotary pumps will be described in the following that are driven by a so-called bearing-free motor that in particular provide special advantages for very specific applications and/or on the conveyance of highly sensitive liquids, to which reference will be made in the following, that are not available for conventionally stored rotary pumps.

Such a specific rotational pump or rotary pump as is e.g. already basically disclosed in the EP 0860046 A1 and in the EP 0819330 A1, respectively, comprises a housing and a pump wheel arranged within the housing, in which the pump wheel comprises a passive, magnetically effective rotor part and the housing is surrounded by a stator having electric coils and teeth which are arranged, configured and controllable in such a way that the stator and the rotor part cooperate as a so-called bearing-free motor.

Through the use of a bearing-free motor in the sense of the present application the rotor part of the pump can be actively controlled with respect to three degrees of freedom and both the position of the rotor part in a plane extending perpendicular to the axis of rotation in x and y direction and also a torque acting in the circumferential direction on the rotor part can be predefined by a corresponding control of the electric coils.

In this connection the rotor part and the teeth of the stator can e.g. be configured and arranged with respect to one another in a mutually adapted manner from a geometric point of view in such a way that the rotor part can be held in the stator with respect to three further, non-actively controllable degrees of freedom, by passively acting reluctance forces such that the rotor can be driven within the housing and is stably arranged contactless in a levitating manner. An advantage of this arrangement can be seen therein that the position of the rotor with respect to a plane extending perpendicular to the axis of rotation can be actively controlled such that a controllable torque can act on the rotor and such that the position of the rotor can be held in the stator with respect to the three further degrees of freedom by passively acting magnetic forces in a stable position.

In this connection the rotational pump is configured e.g. in the form of an axial pump or of a centrifugal pump, wherein the rotor is correspondingly configured as an axial wheel of an axial pump or as a centrifugal wheel of a centrifugal pump. The magnetically acting rotor part that can be a component of the axial wheel or of the centrifugal wheel is held in the direction of the axis of rotation and/or in the axial direction only by means of passively acting magnetic forces. For this reason the stator and the rotor part are configured in such a way that a sufficiently large passively acting magnetic force acting on the rotor is brought about for the operation of the rotational pump or of the rotary pump. This can be achieved through a corresponding design and geometric arrangement of the magnetically acting components of the rotor part and of the stator part in that, for example, the teeth of the stator part have approximately the same height in the axial direction as the rotor part and in that the diameter of the rotor part is designed at least twice as large as its height in the axial direction, this means that this is a "flat rotor part". The magnetic forces acting passively in the axial direction can moreover be increased by a permanent magnetic bias of the stator as well as of the rotor part. The storing force in the axial direction can, moreover, be increased by additional bearing apparatuses, such as a hydrodynamically acting bearing that is formed and/or supported e.g. by the pumping liquid. Moreover, it can be found to be advantageous, but is not strictly necessary, to provide a mechanical bearing apparatus acting in the axial direction which serves as an emergency bearing apparatus in order to hold the rotor part in a certain position for very large axial forces.

A bearing-free motor as has already been used successfully in practice for many years is understood by the person of ordinary skill in the art to be an electronically controllable bearing and drive apparatus which comprises a rotor, as well as a stator having electromagnetic coils. The rotor of the bearing-free motor can be driven in accordance with the known principle of electric machines, this means in accordance with the set pattern of a synchronous motor, a reluctance motor or an induction motor. The rotor of the bearing-free motor is held contactless in the stator at least in a plane extending perpendicular to the axis of rotation by magnetically acting forces. The electromagnetic coils can be controlled in such a way that the position of the rotor can be actively influenced in a plane extending perpendicular to the axis of rotation of the rotor. The position of the rotor is monitored with sensors and the electromagnetic coils are controlled with a correspondingly designed control apparatus in a regulatable manner such that the rotor is held contactless in the stator with respect to the plane extending perpendicular to the axis of rotation of the rotor. Moreover, a torque can be produced at the rotor via a corresponding control of the electromagnetic coils of the stator such that this experiences a rotation about its axial axis. Such a so-called bearing-free motor can thus control a rotor with respect to three degrees of freedom, namely the position in the x and y direction, as well as the rotation about its own axis. A bearing-free motor having these properties can be configured by different constructional shapes.

Such a bearing-free motor can, for example, be configured as a reluctance motor in that the rotor, for example, is configured in a crossed manner, and the stator is configured from a plurality of electrically individually controllable coils extending in the radial direction arranged in the circumferential direction around the rotor. These coils are preferably controllable in such a way that the rotor is held in a levitating manner with respect to a plane extending perpendicular to the axis of rotation and the rotor can moreover be driven in a rotating manner about its axis of rotation in that a magnetic rotary field is produced with the coil.

A bearing-free motor can, however, also be configured, for example, similar to a synchronous motor in that the rotor has a permanent magnet extending in the radial direction and the stator has a rotary field coil also referred to as a drive coil for the generation of a rotary field which drives the rotor about its axis of rotation in a rotating manner. Moreover, the stator can have a separate control coil in order to control the position of the rotor in a plane extending perpendicular to the axis of rotation, wherein the position of the rotor and/or of the magnetic flux is determined with sensors and the control coil is controlled via a control apparatus in such a way that the rotor is held in a contactless manner in the stator in the plane extending perpendicular to the axis of the stator.

A rotary pump or rotational pump correspondingly configured with such a bearing-free motor and configured as an axial pump or as a centrifugal pump is in particular suitable for the conveyance of highly pure, aggressive, explosive or toxic fluids and liquids and is likewise particularly suitable as e.g. a blood pump.

Due to the contactless storage, the rotor can e.g. be operated at a very high speed of rotations such that the rotational pump has a high conveying performance also for very small constructional sizes. A further advantage of such a rotational pump should be seen therein that the rotor can be operated also at a speed of rotation variable in time and the fluid can be conveyed even in a pulsed manner which, on the other hand, in particular however also means that such a pump can be regulated in a fast manner and thus e.g. fast pressure variations in the flow system can be regulated without a problem by means of such a pump comprising a flow regulator in accordance with the invention. The speed of rotations of the rotor can be freely controlled between the still-stand and a very high speed of rotations such that the rotational pump has a large dynamic with respect to the amount conveyed and both very small amounts of fluid and also very large amounts of fluid can be conveyed, whereby a very high dynamics and accuracy of regulation of the flow regulator in accordance with the invention is additionally positively influenced.

However, not only the regulation characteristics of a flow regulator in accordance with the invention is very positively influenced through the use of a bearing-free motor. As mentioned circular pumps, that are based on the principle of a bearing-free motor, are, in a particularly good way, particularly suitable to convey sensitive or highly pure liquids, such as for example blood that, like different kinds of biological or technical liquids, is also a liquid that reacts in a particularly sensitive manner to mechanical influences.

Thus, having regard to sensitive liquids, such as blood or highly pure pharmaceutical, biological or chemical products, contaminations have got to be avoided without fail. Such contaminations can, for example, arise for a conventional mechanical bearing in the form of bearing lubricants or mechanical wear and can lead to contaminations of the fluids in the flow system.

If the flow system is e.g. a ventricle support system for supporting a human or animal blood circuit, this means a flow system composed of a blood pump, cannulas and inlets, which, for example, during an operation form a bypass for the heart, or in a long term application is provided as a relief for a weakened heart, then the amount of through-flow, this means the volume flow of the blood, is a very critical system parameter that has to be continuously monitored and has to be regulated sensitively by a suitable control. The setting of a predefinable volume flow of the blood is a particularly critical challenge with respect to different aspects in such a flow system.

For example, if constrictions and/or a local strong mechanical load is brought about in the ventricle support system, e.g. a compression of the blood between an impeller and the housing of a pump in the flow system, then a destruction or a squashing of the red blood cells results or deposits and/or residues of blood, in the worst case even a clotting of the blood can be brought about which leads to extreme damages of the patient, such as thromboses, vascular occlusions and even to an infarct and in the worst case to the death of the patient.

The use of the bearing-free motor as drive of the pump completely excludes such a risk, as the rotor of the pump levitates freely in the housing, and no mechanical bearings exist and for this reason the danger of a squashing of a liquid is practically excluded.

The regulating pump, the additional pump, as well as all or a part of the connection lines, the pressure regulator and possibly even the sensors or further components of a flow regulator in accordance with the invention can also be configured as a single use part or as a disposable product.

A single use part or a disposable product in the framework of this application is understood as a part that is determined for a one-time use only and is not cleaned after a single use, nor is it sterilized or restored in any other way, but is not used again after its one-time use for a specific intended application, but is generally discarded after its one-time use. The flow regulator or certain components of the flow regulator are in particular advantageously configured as single use products or as disposable products when the flow regulator is used for highly pure liquids or for sensitive liquids, such as highly pure pharmaceutical liquids, biological liquids or medical liquids. In particular when cross-contaminations should absolutely be prevented, so that a component of the flow regulator used once for a first liquid is not allowed to be used again for a second liquid and/or when the cleaning, sterilizing or in a general way the restoration of the corresponding would lead to such a large demand in effort and cost that this is technologically not sensible and/or is economically non-viable.

As is well known to the person of ordinary skill in the art corresponding single use parts, single use products or disposable products (terms that should be understood synonymously in the framework of this application), as they are, for example frequently used in bioreactor plants, e.g. in accordance with EP 1087010 A1 or different plants are produced particularly preferably from cheap materials, such as suitable, in particular biocompatible and/or cost-effective plastics, such as e.g. polypropylene, polyethylene, polyvinylchloride (PVC) or polycarbonate that can be processed very cheaply e.g. on use of injection molded processes etc. Less suitable are expensive fluoropolymers, such as PTFE or PFA. In this connection not only the very high prices are disadvantageous, but the fact that also poisonous materials such as e.g. fluoric acid can arise on the gamma ray sterilization of such fluoropolymers. Apart from plastics of all kind the person of ordinary skill in the art naturally also knowns a plethora of different cheap materials that are suitable for the production of single use products. Moreover, such single use product must frequently also be sterilized which in practice frequently takes place advantageously on use of radioactive gamma rays, heat, by means of chemical methods or by different methods known to the person of ordinary skill in the art. This means the materials used must naturally survive the correspondingly frequently also material engrossing procedures at least once without damage. On the other hand, single use parts or single use products are not necessarily, but frequently also characterized in that they can only survive the corresponding sterilization methods once without being damaged such that they become non-usable. Thus, also this is a clear characteristic for a disposable part and/or a one-time product. A single use product is also packaged in a sterile manner and delivered like this to the customer. In contrast to this, components that are produced from relatively expensive materials and which are designed for multiple sterilizations are not to be understood as a single use product.

In the case of a flow regulator in accordance with the invention in particular the regulating pump or the additional pump is configured as a single use pump and/or the parts thereof are configured as single use parts. Thereby, in particular, the sterilization demanding in effort and cost is dispensed with for a further use, as the parts are used exactly once. Having regard to a particularly advantageous embodiment, the single use parts of the regulating pump or of the additional pump are produced in the form of a single use pump and are produced from a plastic, as such parts can be produced economically with a high reliability, for example, by injection molding processes, as was already mentioned.

In this connection the single use pump preferably comprises a pump housing in which a pump wheel is arranged, as well as a separate drive stator into which the pump housing can be introduced together with the pump wheel arranged therein. The housing including the pump wheel arranged therein is configured in this connection as a single use part. This embodiment is insofar particularly advantageous as all "contaminated parts", namely the pump housing (inner wall) as well as the pump wheel arranged therein can be exchanged in dependence on the application in a simple kind and manner and the parts more demanding in effort and cost (electrical supply of the drive, etc.) can be maintained and can be reused for the next application without the danger of any form of contamination existing. For the rest the electrical drive not only represents the technically most demanding part of the pump but also from an economic point of view is the most demanding part of the pump. However, this does not have to be replaced, but only the less demanding pump housing and the pump wheel present therein are replaced.

Having regard to a further advantageous development of this embodiment, permanent magnets are arranged in the pump wheel which then together with the electromagnetic field generated by the drive stator ensures the drive of the pump wheel.

Naturally, a bearing-free motor for the drive of the regulating pump or of the additional pump is not only advantageously suggested in such cases in which single use products are used. Other examples can be found in cooperation with specific industrial processes. For example in the semiconductor industry and during chip manufacture the requirement exists to process the surfaces of substrates, for example the surfaces of wafers for the manufacture of electronic components with suspensions in a controlled manner in order to process their surfaces. As an important example in this connection chemically mechanical polishing processes (CMP, chemical mechanical planarization, purification and/or etching of wafers or the removal of fotolack with solvents, also referred to as polymer removal) are mentioned such as they are used e.g. in the semiconductor industry.

The reliable setting of the volume flows of the aforementioned process liquids plays an important role in the corresponding plants in which such processes are carried out.

Also in this connection the use of the described bearing-free motors as a drive for the regulating pump and/or of the additional pump of a flow regulator in accordance with the invention has enormous advantages. As no mechanical bearings exists also the danger that the mechanical bearing can be attacked and/or destroyed by physically or chemically aggressive liquids, such as slurries, paints, acids, bases or other aggressive liquids does also not exist.

However, the pumps are also particularly suitable for the above-mentioned highly pure liquids, as no wear can be present in the bearing and no lubricated bearing axles are present by means of which the liquid to be pumped can be contaminated.

These are only a few prominent examples that clearly favor a pump driven by a bearing-free motor in contrast to known, conventionally supported pumps for the use in a flow regulator in accordance with the invention.

The regulating pump and/or the additional pump as such, are in this connection configured as a rotary pump and particularly preferably configured as a centrifugal pump or as an axial flow pump or as a side passage pump or as a diagonal flow pump or as a different kind of rotary pump.

The invention further relates to a method for setting a predefinable volume flow with a flow regulator in accordance with the invention.

BRIEF DESCRIPTION OF THE DRAWINGS

The invention will be explained in more detail hereinafter with reference to the drawings.

FIG. 7 is a schematic through-flow vs. speed of rotations diagram of the flow regulator in accordance with the invention;

DETAILED DESCRIPTION OF THE EMBODIMENTS

Figure 1:
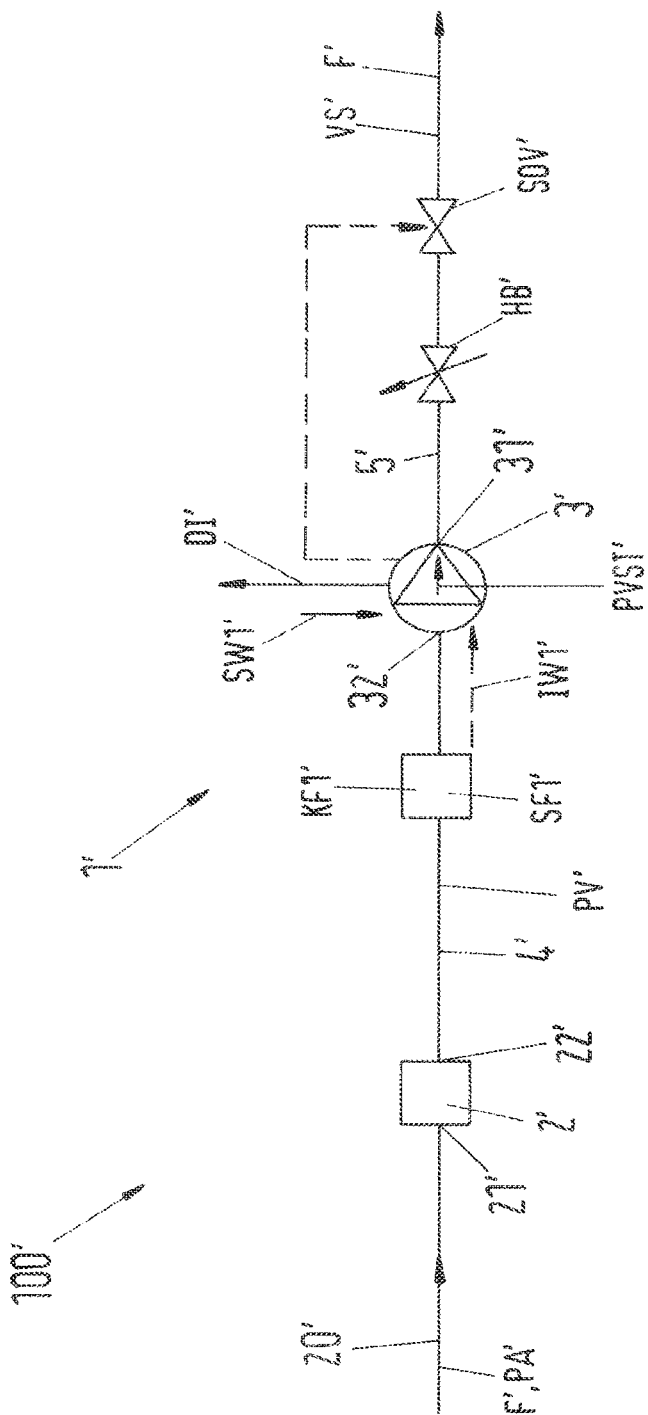
FIG. 1 is a flow regulator known from the state of the art.
Figure 2:
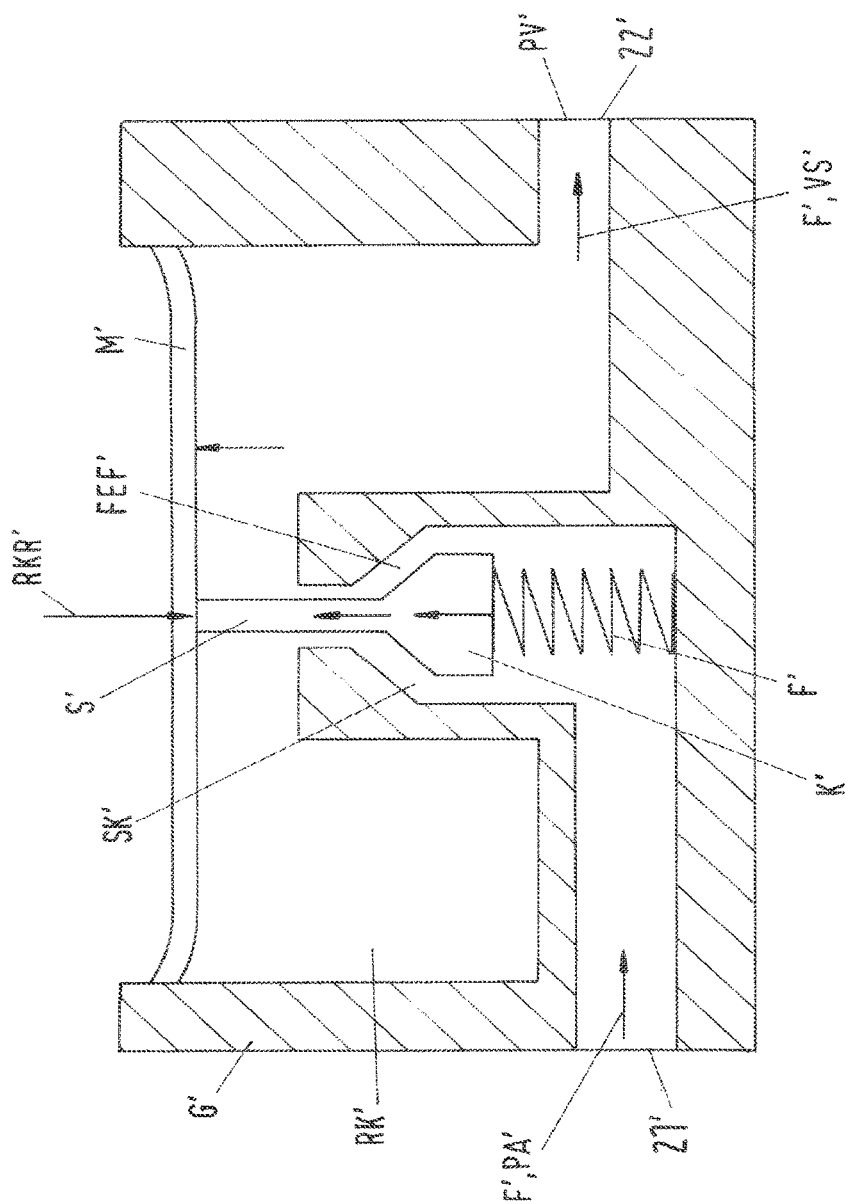
FIG. 2 is a passive pre-pressure regulator known per se.

The FIGS. 1 and 2 relate to the known state of the art for a better understanding of the invention and have already been discussed in detail in such a way that a further discussion is not required at this point in time.

Figure 3A:
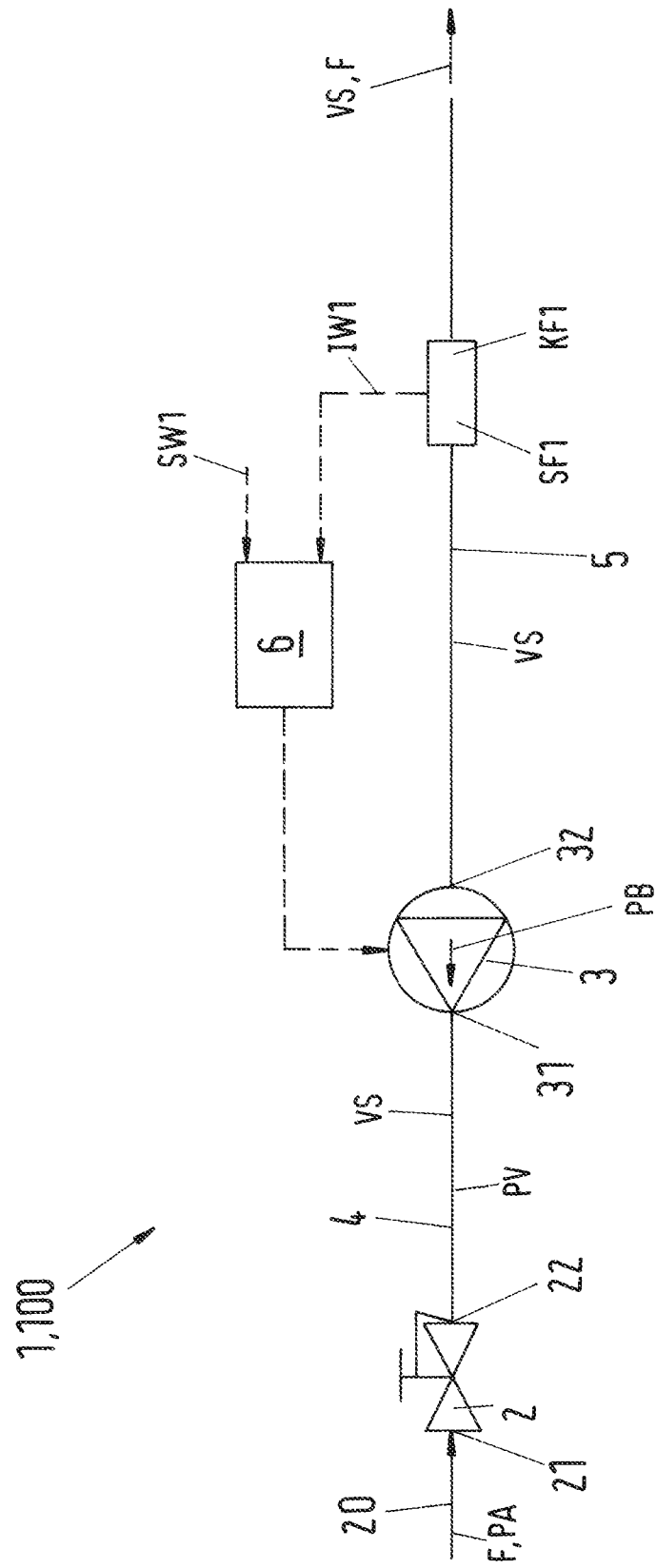
FIG. 3A is a first preferred embodiment of a flow regulator in accordance with the invention having a through-flow sensor.

In a schematic illustration FIG. 3A shows a particularly preferred and at the same time simple embodiment of a flow system 100 having a flow regulator in accordance with the invention which will be referred to in the following totally with the reference numeral 1.

The person of ordinary skill in the art understands that all features that are provided with the same reference numerals in the different Figures are respectively associated with an analog technical meaning in such a way that not all functional or technical associations have to be respectively repeated time and again on the description of the various Figures. The person of ordinary skill in the art naturally knows how he can correctly transfer the description of one technical detail of a Figure to a different one in an analog manner.

The flow regulator 1 in accordance with FIG. 3A for setting a predefinable volume flow VS of a fluid F in a flow system 100 comprises a first sensor SF1 for determining a first actual value IW1 of a first flow parameter KF1 of the fluid F, a pre-pressure regulator 2 for setting a predefinable pre-pressure PV at a pre-pressure outlet 22 of the pre-pressure regulator 2, as well as a regulating pump 3 in the form of a rotary pump. In this connection the fluid F is supplied in the operating state at a plant pressure PA to the pre-pressure regulator 2 via an inflow line 20 and a pre-pressure inlet 21 and is conducted further at the pre-pressure PV to the regulating pump 3 via a flow connection 4 provided between the pre-pressure outlet 22 and the regulating pump 3. In accordance with the invention the pre-pressure outlet 22 is connected to a high pressure connection 31 of the regulating pump 3 in a flow communicating manner via the flow connection 4, in such a way that the fluid F can be supplied from the pressure regulator 2 to the regulating pump 3 and can be removed again from the regulating pump 3 via a low pressure connection 32 into an outflow line 5.

This is the decisive difference to the flow regulators 1' known from the state of the art which is why the present invention is far more superior to them, as a much higher accuracy of regulation can be achieved by means of the flow regulator 1 in accordance with the invention, in particular as one can regulate in a sufficiently precise manner with regard to a vanishing volume flow VS and the flow direction of the volume flow VS can even be reversed in the flow system 100, if required.

For setting the predefinable volume flow VS a speed of rotations of the regulating pump 3 is predefined by means of a regulating control 6 on use of a first desired value SW1 in dependence on the first actual value IW1 of the first flow parameter KF1 in such a way that a limiting pressure PB acting against the pre-pressure PV can be produced by means of the regulating pump 3, as is indicated by the arrow referred to with PB in the symbol of the regulating pump such that the predefinable volume VS of the fluid F can be set as predefined in the outflow line 5. Having regard to the specific embodiment of the FIG. 3a, the first sensor SF1 is a first through-flow sensor SF1 and the first flow parameter KF1 characterizes a fluid flow KF1 of the fluid F.

A remaining deviation of regulation of the pre-pressure regulator 2 is essentially eliminated through the through-flow regulation with the regulating pump 3 and the volume flow VS at the outlet of the flow system 100 can be regulated downwards up to a vanishing value of 0 l/min. The flow regulator 1 in accordance with the invention has an exceptionally high through-flow regulating range, a high regulating dynamic and is extremely robust with respect to pressure deviations of the plant pressure PA of the supply system.

Figure 3B:
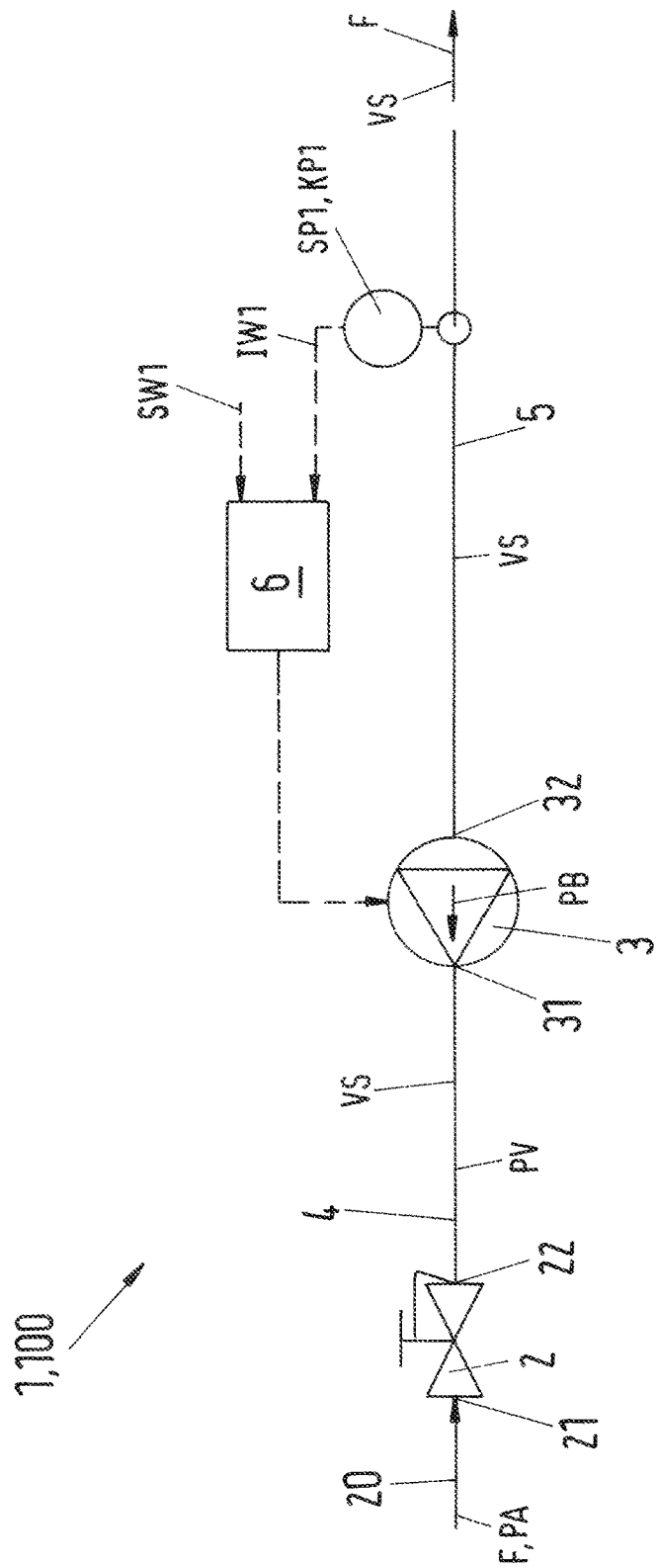
FIG. 3B is a second embodiment in accordance with FIG. 3A having a pressure sensor.

The specific embodiment of the FIG. 3B merely differs from that of the FIG. 3A thereby that the first sensor SP1 is a first pressure sensor SP1 and the first flow parameter KP1 characterizes a first fluid pressure KP1 in the fluid F. The person of ordinary skill in the art understands straightaway that in principle also other sensors other than through-flow sensors or pressure sensors can be used in as far as their measurement parameters can be suitably converted for a reliable control and/or regulation of the regulating pump 3. In this connection a remaining deviation of regulation of the pre-pressure regulator 2 can be essentially eliminated through the pressure regulation with the regulating pump 3 having regard to the assembly in accordance with FIG. 3B and the pressure at the outlet of the flow system 100 can be regulated down up to a vanishing pressure of 0 bar. A high dynamic of regulation as well as a high robustness with respect to pressure deviations of the plant pressure PA of the supply system additionally characterize not only the embodiment in accordance with FIG. 3B.

In practice the fluid F is practically always a substantially incompressible liquid, such as e.g. water, an oil, a slurry for polishing semiconductor wafers, a medical or biological liquid, such as for example blood, or any other substantially incompressible liquid.

In principle it is not excluded in this connection to use the flow regulator 1 in accordance with the invention also for the setting of a volume flow VS of a more or less compressible fluid F. However, additional measures, measures known to the person of ordinary skill in the art, such as a calibration of the sensor measurement values, the use of different sensors and/or of additional sensors etc. are then required for a correct control and/or regulation. Independent thereof the invention is not limited to the use of incompressible liquids, also when this will be the main field of application of the invention in practice.

In particular in the case of substantially incompressible fluids F it generally does not play an essential role where exactly the fluid sensor is provided in the flow system, as the volume flow in the case of an incompressible liquid in a closed flow system 100 that has no additional inlets or outlets for the fluid, e.g. in the form of intermediate reservoirs or different sources or sinks for the liquid, must be the same throughout. Naturally apart from typically small effects, such as delay effects, e.g. due to fast pressure deviations or the like or different comparatively fast flows in the system which the person of ordinary skill in the art correspondingly knows how to consider on designing the regulation.

Also a pressure sensor can in principle be provided at different positions of the flow system. The person of ordinary skill in the art must only correspondingly consider these on a calibration of the control or regulation.

Figure 4A:
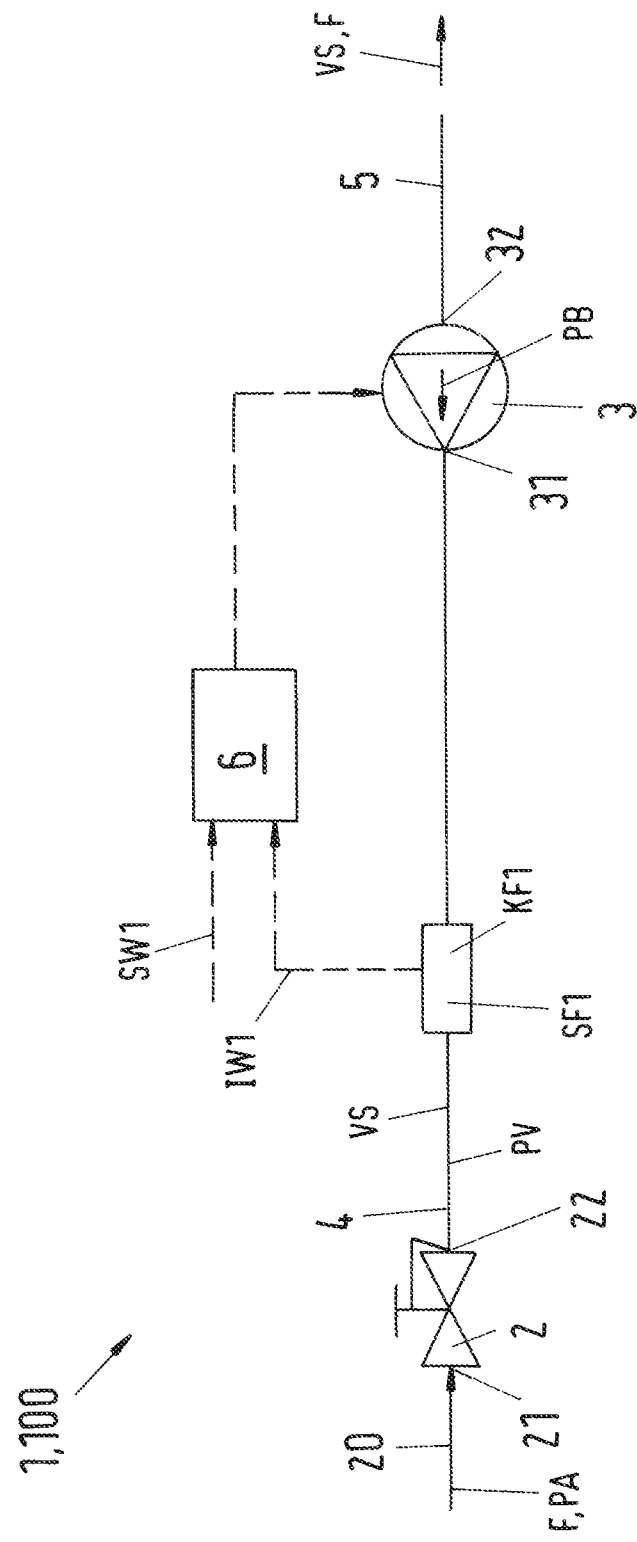
FIG. 4A is another embodiment of a flow regulator in accordance with the invention having a through-flow sensor in front of the regulating pump.
Figure 4B:
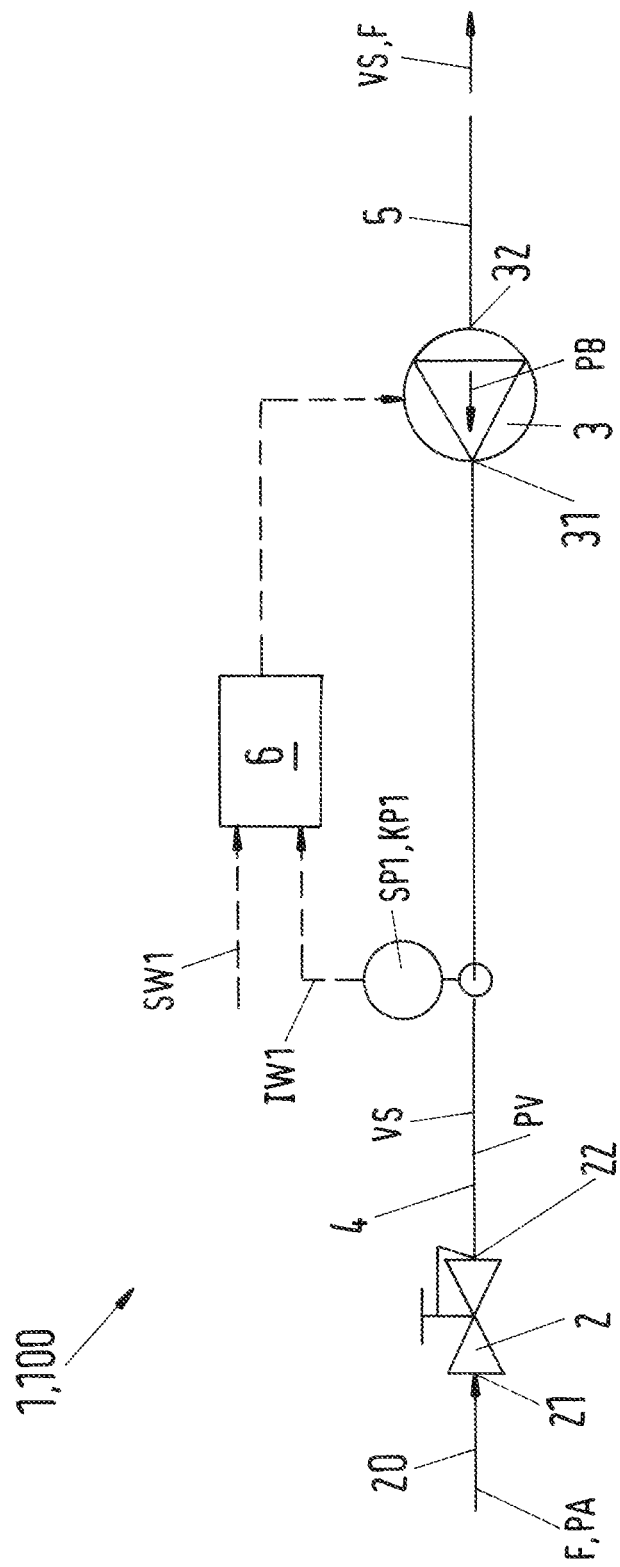
FIG. 4B is a further embodiment in accordance with FIG. 4A having a pressure sensor.

For this reason, also the specific embodiments in accordance with the FIG. 4A and/or FIG. 4B can be realized without further ado in practice. The FIG. 4A and FIG. 4B merely differ from those of FIG. 3A and/or FIG. 3B thereby that the first through-flow sensor SF1 of FIG. 4A is provided between the pre-pressure regulator 2 and the regulating pump 3, whereas the first through-flow sensor SF1 in the embodiment of FIG. 3A is arranged downstream of the regulating pump 3. In analogy thereto the first pressure sensor SP1 is provided between the pre-pressure regulator 2 and the regulating pump 3 in FIG. 4B, whereas the first pressure sensor SP1 is arranged downstream of the regulating pump 3 in the embodiment of the FIG. 3B.

Figure 5A:
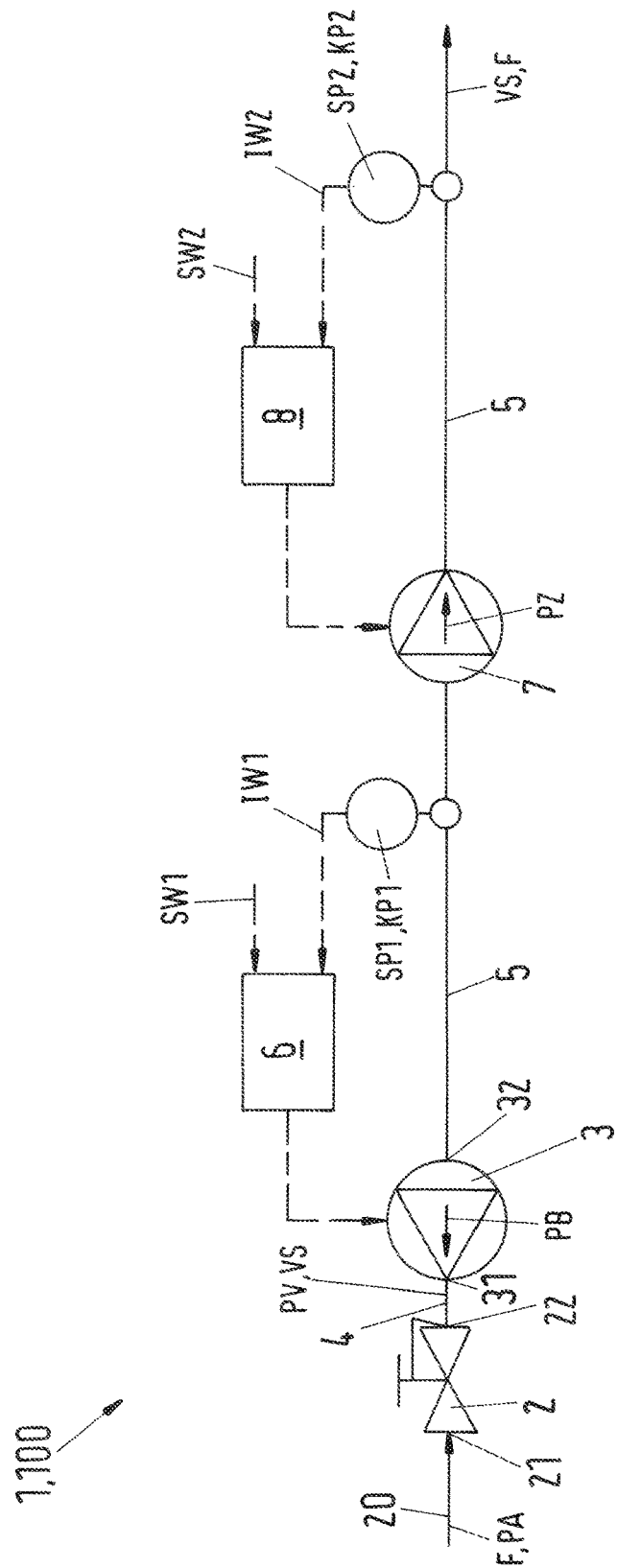
FIG. 5A is an embodiment having a booster pump and two pressure sensors.
Figure 5B:
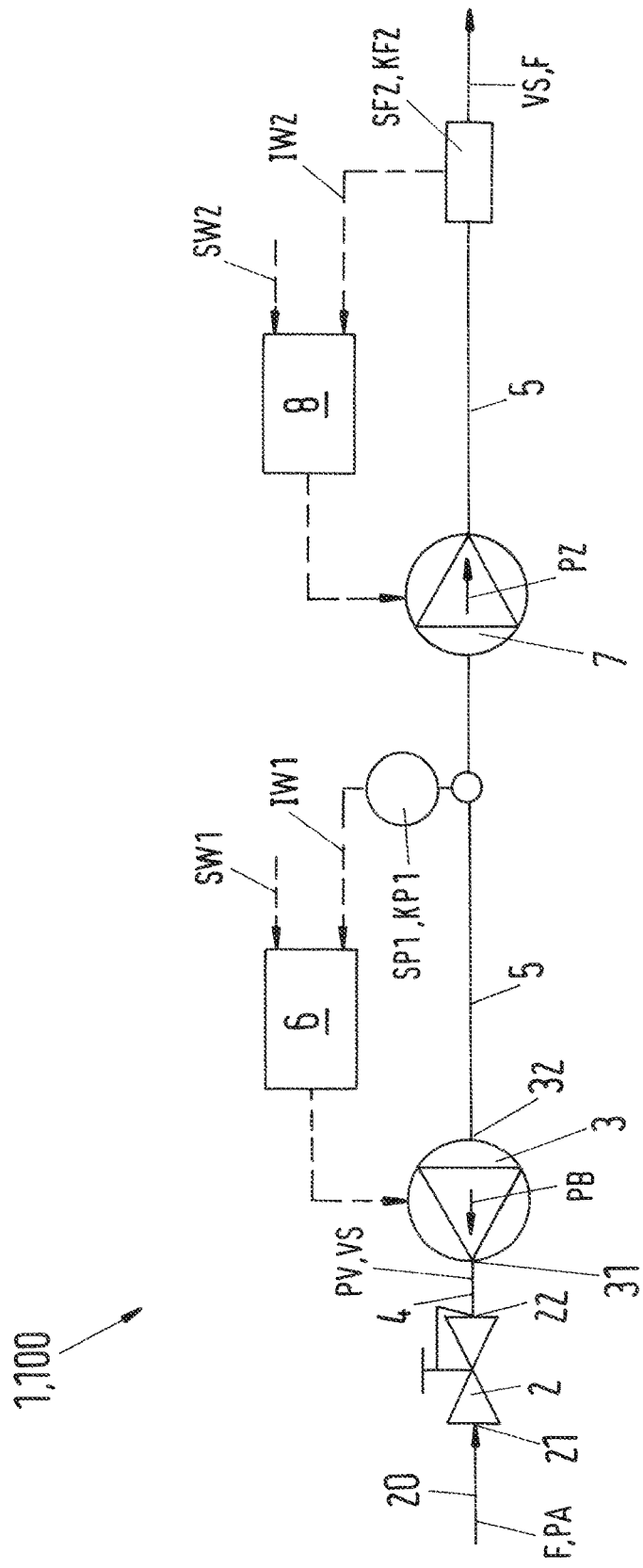
FIG. 5B is a second variant in accordance with FIG. 5A having a pressure sensor and a through-flow sensor.
Figure 5C:
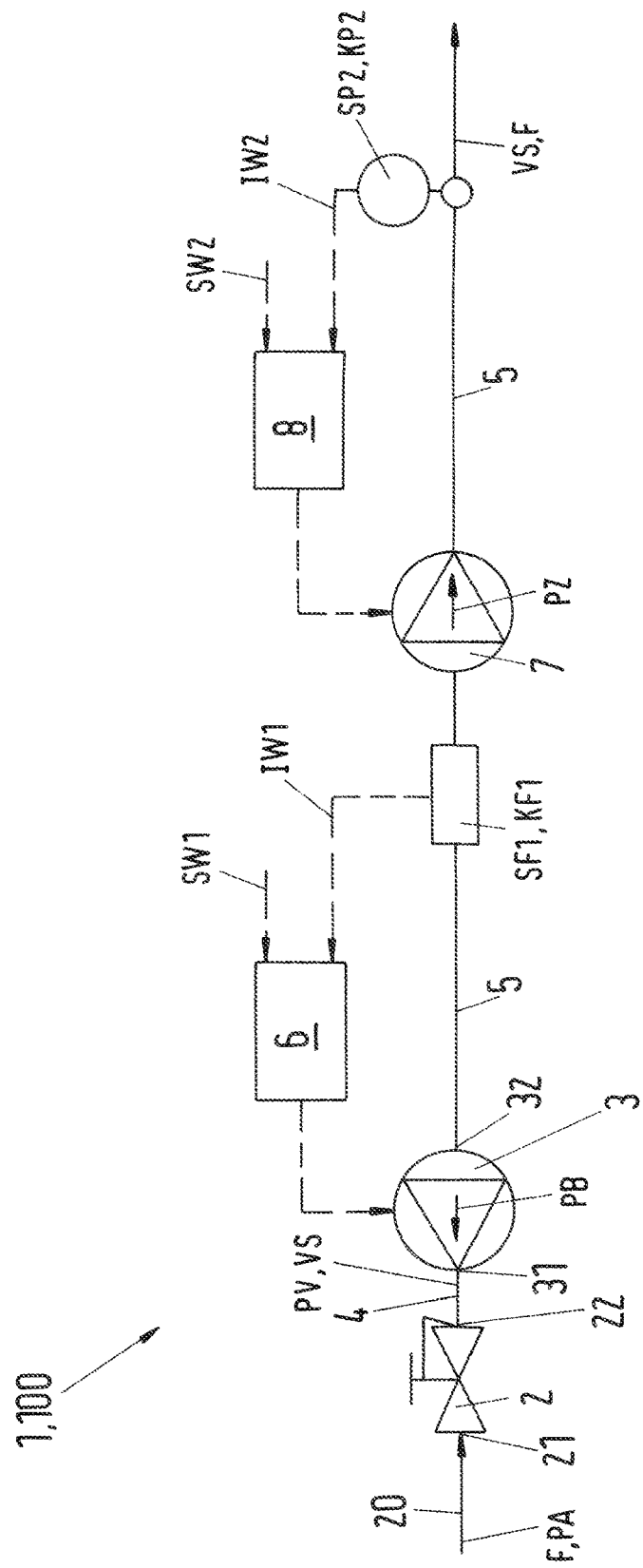
FIG. 5C is another variant in accordance with FIG. 5B.

The FIG. 5A, FIG. 5B, and FIG. 5C respectively show a further variant of embodiment having an additional pump 7 having the function of a booster pump amplifying a pressure, wherein the control of the additional pump 7 and the regulating pump 3 takes place separately respectively via an own sensor SP1, SF1 and SP2, SF2 respectively with regulating control 6 for the regulating pump 3 and separate additional control 8 for the additional pump 7. In this connection a respective second sensor SF2, SP2 is provided for the determination of a second actual value IW2 of a second flow parameter KF2, KP2 of the fluid F at the outflow line 5 downstream of the additional pump 7 in such a way that a speed of rotations of the additional pump 7 can be controlled and/or regulated by means of the additional control 8 on use of a second desired value SW2 in dependence on the second actual value IW2 of the second flow parameter KF2, KP2 in such a way that the predefinable volume flow VS of the fluid F can be set to the predefined value in the outflow line 5.

Such and similar variants of embodiments in accordance with the invention in accordance with FIG. 5A-FIG. 5C are conceived for specific requirements in practice. Thus, the embodiment in accordance with FIG. 5A is particularly suitable for such applications in which the pressure at the outlet of the flow system 100 has to be regulated in a very precise manner, in particular then when very small quickly vanishing pressures in the vicinity of 0 bar have to be reliably controlled and/or regulated with a high resolution. In contrast to this the variant of embodiment in accordance with FIG. 5B and/or in accordance with FIG. 5C are particularly suitable at the same time for an ideal pressure and through-flow setting. In this connection the variant in accordance with FIG. 5B besides a very high resolution of regulation with respect to the pressure is additionally optimized with respect to a very high accuracy of regulation with respect to a vanishing or nearly vanishing volume flow VS at the outlet of the flow system 100. The embodiment in accordance with FIG. 5C, besides a very good resolution of regulation with respect to the volume flow VS, at the same time ensures a high resolution of regulation, in particular with respect to a vanishing or nearly vanishing pressure at the outlet of the flow system 100.

Figure 6A:
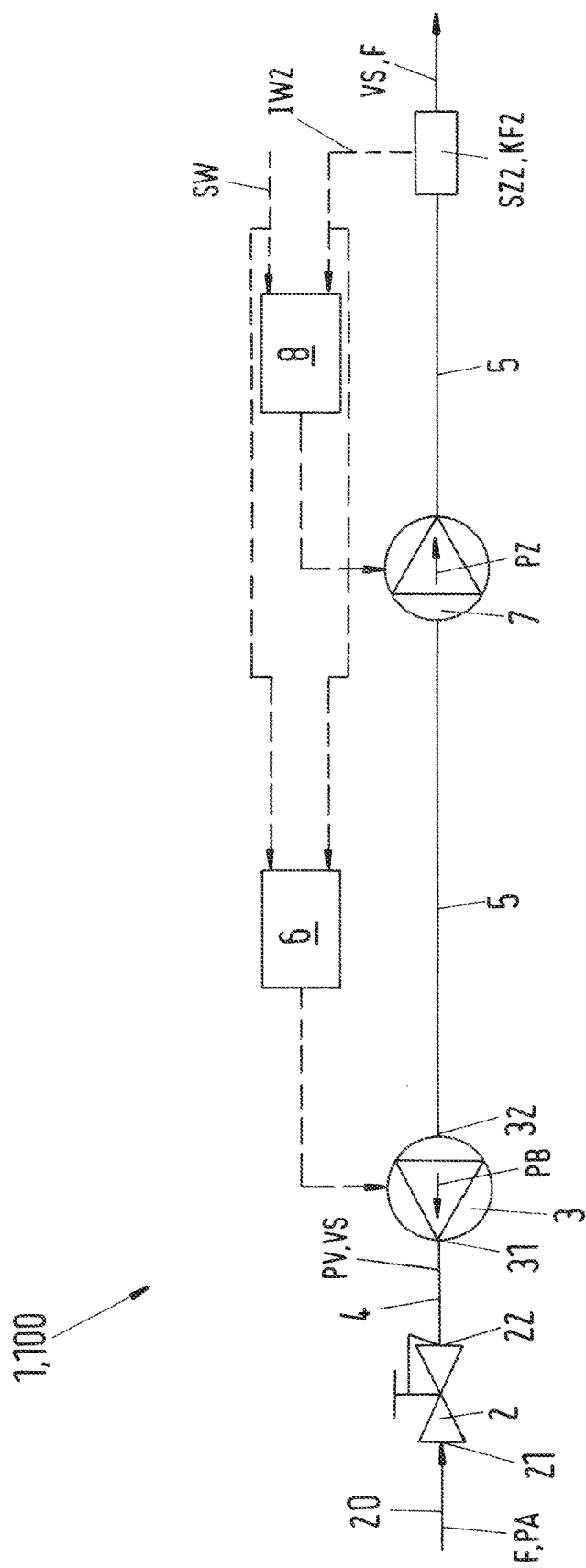
FIG. 6A is a further variant of an embodiment having a booster pump and regulators coupled in parallel.
Figure 6B:
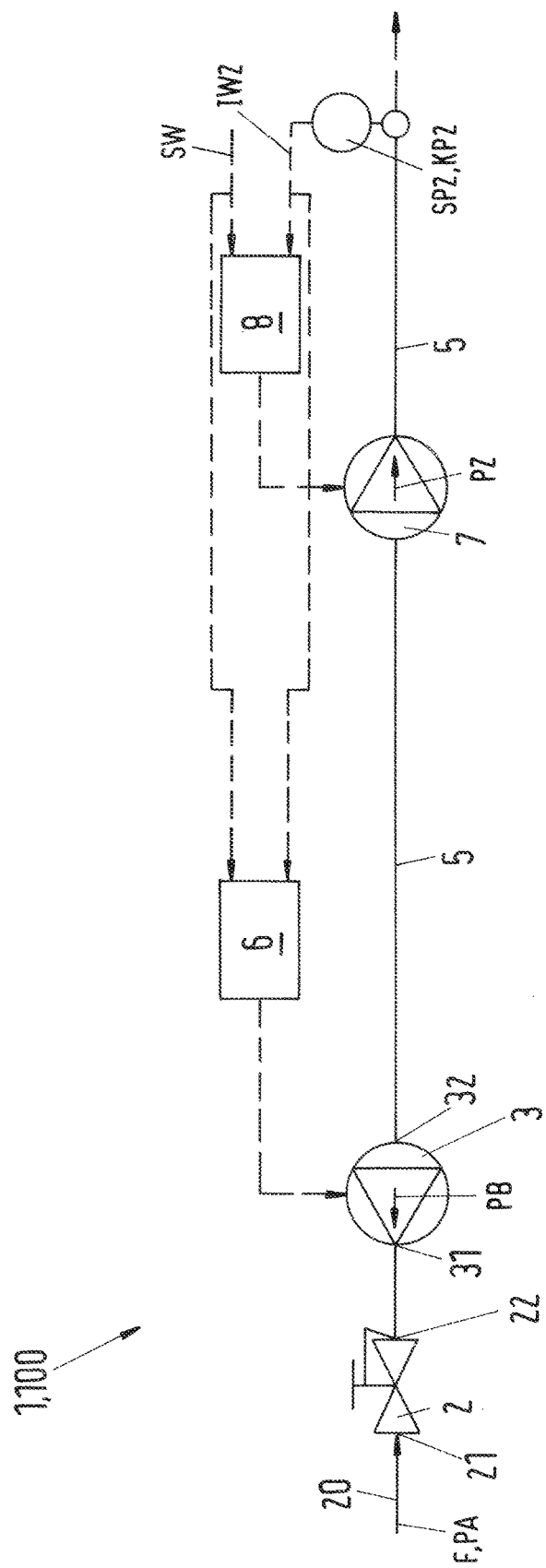
FIG. 6B is a second variant of an embodiment in accordance with FIG. 6A having a pressure sensor.

The FIG. 6A and FIG. 6B respectively show a further variant of embodiment having a booster pump, wherein in this example the regulating control 6 for the regulating pump 3 and the additional control 8 for the additional pump 7 configured as a booster pump are coupled in parallel and are fed with the measurement data of only one commonly used sensor SF2, SP2, wherein in the example of embodiment in accordance with FIG. 6A the second through-flow sensor SF2 is used as a sensor, whereas in the example of embodiment in accordance with FIG. 6B the second pressure sensor SP2 is used as a sensor.

Also having regard to the embodiments in accordance with FIG. 6A and FIG. 6B a remaining deviation of regulation of the pre-pressure regulator 2, as explained in the foregoing, can be eliminated by means of the through-flow regulation with the regulating pump 3. Whereas, in particular having regard to the example in accordance with FIG. 6A, the volume flow at the outlet of the flow system can be regulated to a vanishing volume flow close to or to exactly zero (up to 0l/min) or even to a reversed volume flow, the variant in accordance with FIG. 6B is particularly suitable to down regulate the pressure at the outlet of the flow system to a vanishing pressure close to or exactly to zero (up to 0 bar). These two variants of embodiments also have a high dynamic of regulation and are extremely robust with respect to deviations of the plant pressure PA of the supply system.

In this connection both variants of embodiments profit from an expansion of the control variable through the additional pump 7 switched in series with regard to the regulating pump 3, wherein having regard to the embodiment in accordance with FIG. 6A a desired differentiation of the volume flow additionally produces pressure and having regard to the embodiments in accordance with FIG. 6B a desired value of the plant pressure PA of the supply system additionally produces pressure on the desired differentiation.

With reference to the schematic FIG. 7 the enormous advantages of a flow regulator 1 in accordance with the present invention can be demonstrated in an impressive manner. The FIG. 7 shows a schematic through-flow versus a speed of rotations diagram of the regulating pump 3 together with the pre-pressure regulator 2, wherein in accordance with the invention the pump 3 is subjected to the pre-pressure PV of the pre-pressure regulator 2. At the abscissa the volume flow VS is applied in arbitrary units and on the ordinate the speed of rotations U of the regulating pump 3 is applied in arbitrary units. The three curves respectively correspond to three different values P1, P2, P3 of the pre-pressure PV of the fluid F in the flow system 100, wherein P3>P2>P1 is true. The illustration of the FIG. 7 is characteristic for the behavior of the flow regulator 1 in accordance with the invention as such and, as the abscissa and ordinate are applied in arbitrary units and the pressure values P1, P2 and P3 are not specified in more detail the representation of the FIG. 7 is principally true for all embodiments of a flow regulator 1.

As can clearly be seen from the FIG. 7 the volume flow VS becomes smaller the larger the speed of rotations U of the pump is for a constant pressure P1, P2 or P3. In accordance with expectations, the pump has to be operated at the highest speed of rotations at the largest pressure P3 in order to reduce the volume flow VS to zero than for the lower pressures P1 and P2.

It should be noted that in the diagram in accordance with FIG. 7 the speed of rotation zero (stand-still) of the regulation pump 3 is applied at the upper boundary of the diagram in contrast to the typical illustrations this means that the speed of rotations U increases downwardly towards the direction of the ordinate.

In this connection particular attention should be paid to the regions characterized by A and B in the diagram.

The region A characterizes the behavior of regulation of a flow regulator 1 in accordance with the invention for a small volume flow and/or for a vanishing volume flow VS. The excellent resolution and dynamic of regulation in the range of smaller and/or vanishing volume flows VS can clearly be seen. As can clearly be seen comparatively large changes in speed of rotation of the regulating pump 3 are required in the region characterized with A in order to also bring about only small changes in the volume flow VS. This is equivalent to a very high resolution of the regulation of speed of rotation in this volume flow range. This is one of the decisive differences to the flow regulators 1' known from the state of the art whose resolution of regulation namely always becomes worse precisely in the range of small volume flows VS', in such a way that the known flow regulators 1' in the range of vanishing volume flows VS' always regulate worse and finally cannot regulate at all.

But also in the range of mean volume flows VS that are marked in the diagram of FIG. 7 by the region B, the flow regulator 1 in accordance with the invention shows a significantly improved behavior with respect to the known flow regulators 1'. As can clearly be seen the volume flow VS reacts in a nearly linear manner in dependence on the changes of the speed of rotations U of the regulating pump 3 which is naturally particularly desirable in this range as in this way a change of the speed of rotations U of the regulating pump 3 leads to a nearly proportional change of the volume flow VS.

Figure 8A:
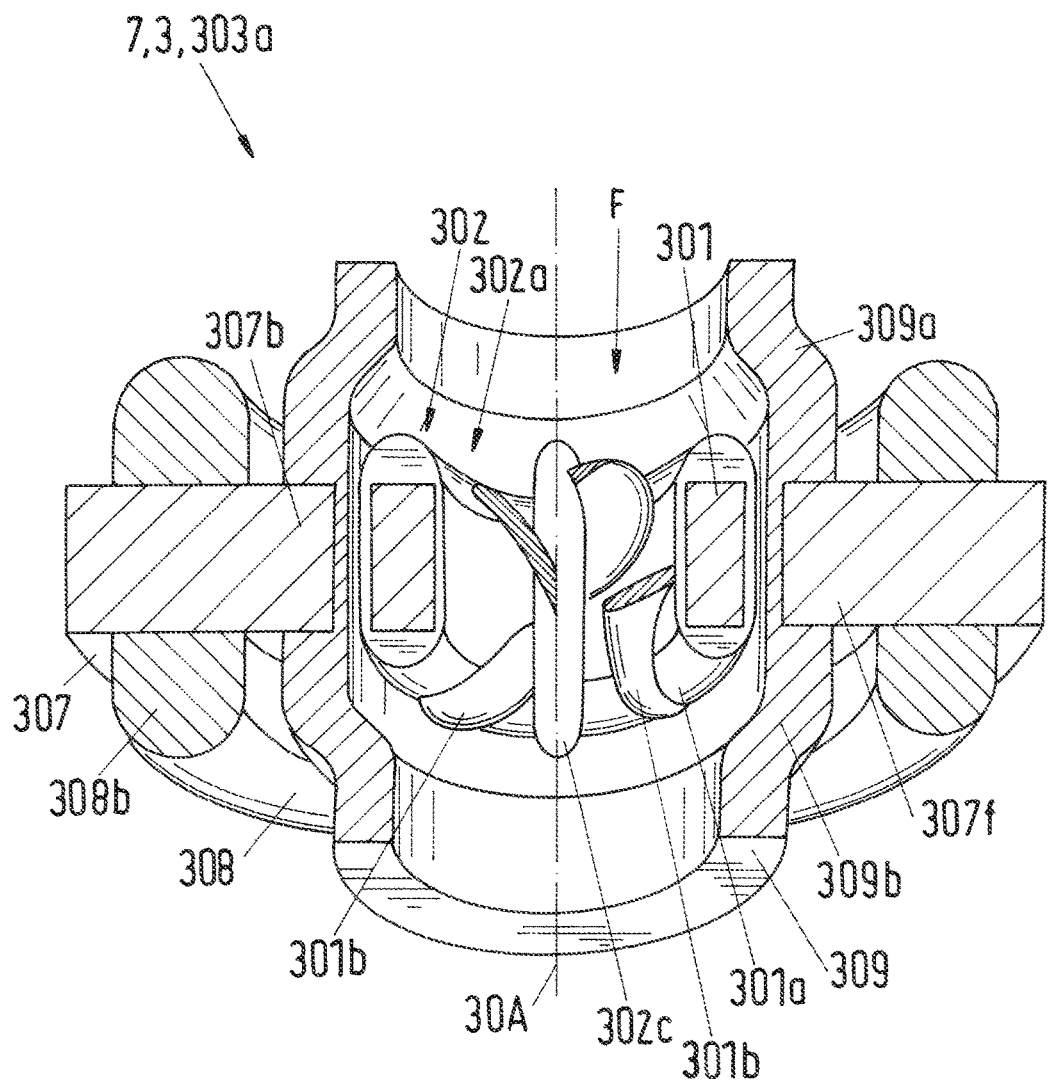
FIG. 8A is schematically a longitudinal section through an axial pump.

FIG. 8A schematically shows a longitudinal section through an axial pump, wherein FIG. 8A stands merely by way of example and representative for axial pumps of all kind, as are known to the person of ordinary skill in the art in numerous variants. The regulating pump 3 of the FIG. 8A that is a rotational pump configured as an axial pump 303a, comprises a housing part 309 which has regions of constriction 309a, 309b. A stator 307 is arranged outside of the housing 309 enclosing the housing in the circumferential direction which stator has teeth 307b, 307f extending in the radial direction. These teeth 307b, 307f lie at the tip between the jacket of the housing part 309 in such a way that a housing section lies between the tip of the teeth 307b, 307f and the internal space of the housing 309, such that the internal space of the housing 309 is completely separated from the stator 307. The stator 307 having the teeth 307b, 307f is formed from a ferromagnetic material. The teeth 307b, 307f are wrapped around by coils 308b, wherein the totality of the coils 308 is illustrated. The rotor 302 configured as an axial wheel 302a, also referred to as an impeller, is arranged in the housing 309. This axial wheel 302a in the illustrated embodiment is configured as a ring-shaped permanent magnet 301 magnetized in the radial direction which is enclosed by a rotor jacket 301a comprising a plastic. Vanes 301b configured extending hydrodynamically, as well as a middle part 301c extending with respect to the axial wheel 302a in the axial direction 30A are arranged within the circular recess of the magnetically effective rotor part 301. The vanes 301b extend in the axial direction 30A over the rotor jacket 301a projecting up to the outer surface of the rotor jacket 301a facing stator 307. The vanes 301b together with the middle part 1c form an impeller favorable for the production of an axial flow, wherein the impeller advantageously has an as large as possible diameter in order to bring about a large pump performance. Advantageously, the vanes 301b are not only arranged extending within the internal diameter of the rotor part 301, but extend, as illustrated in FIG. 1, in the axial direction 30A over the rotor jacket 301a in a projecting manner up until the proximity of the wall of the housing 309. Thereby nearly the complete diameter of the internal space of the housing 309 is utilized for the arrangement of the impeller and/or for the conveyance of the fluid F. The rotor jacket 301a as well as the vanes 301b and the middle part 301c as well as the housing 309 are manufactured from a non-ferromagnetic material, such as a plastic, metal such as titanium, ceramics or a biocompatible material such as polycarbonate. The axial wheel 302a is held contactless within the housing 309 by the stator 307 by means of the magnetically effective rotor part 301 via magnetically acting forces, with a torque effective on the rotor part 301 being able to be produced in order to rotatingly drive the axial wheel 302a about the axis of rotation 30A. Position sensors for determining the position of the axial wheel 302a and the rotor part 301 respectively are not illustrated. These position sensors are preferably arranged either outside of the housing 309 or within the jacket of the housing 309 in order to measure the position of the rotor part 301 or the magnetic flow in a contactless manner. For example an eddy current sensor, an inductive sensor or a hall element having a permanent magnet are suitable as a measurement principle of the position sensors. The position of the axial wheel 302a in a plane extending approximately perpendicular to the axis of rotation 30A can be controlled in a contactless manner through a corresponding control of the windings 308a, 308b, 308c, 308d, 308e, 308f arranged in the stator 307. The windings comprise a drive coil e.g. having a pole pair number p and a control coil having a pole pair number of e.g. p+1 or p−1.

Figure 8B:
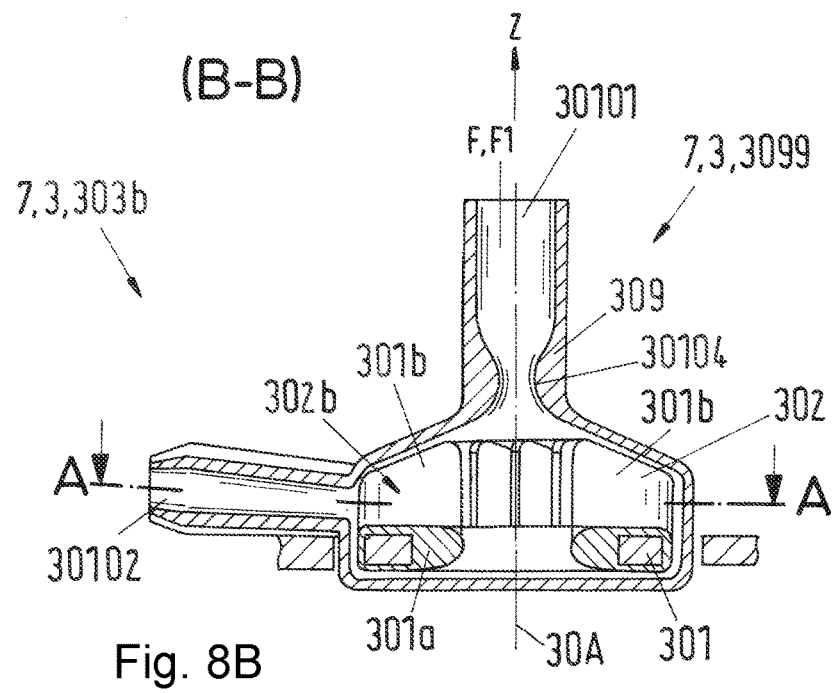
FIG. 8B is schematically a longitudinal section through a centrifugal pump.
Figure 8C:
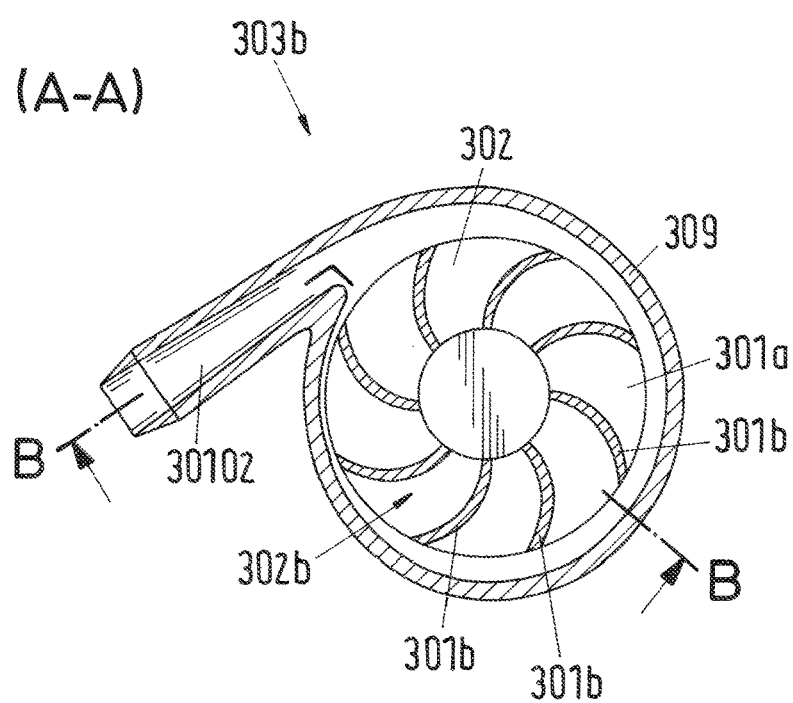
FIG. 8C is a section taken along A-A in FIG. 8B.

FIGS. 8B and 8C schematically show a longitudinal section through a centrifugal pump, wherein FIGS. 8B and 8C stand merely by way of example and representative for centrifugal pumps of all kind as are known to the person of ordinary skill in the art in numerous variants. FIG. 8B shows a longitudinal section through a centrifugal pump along the line B-B of the FIG. 8C, whereas FIG. 8C shows a cross-section through the centrifugal pump in FIG. 8B.

The centrifugal pump 303b is composed of a centrifugal pump part 3099, which comprises the housing 309 with an inner lying centrifugal rotor 302b, as well as a drive and bearing apparatus which is indicated by the teeth 307b, 307f of the stator 307. The stator 307 can be configured as illustrated in the embodiment in accordance with FIG. 8A or FIG. 8C. The housing 309 can be fixedly or releasably connected to the drive apparatus. In an advantageous design of the centrifugal pump 303b the housing 309 as illustrated in FIG. 8B can partly be introduced between the teeth 307b, 307f of the stator 307 and loosely lies on the drive apparatus. The housing 309 can thereby be removed again from the stator 307 in a simple manner and for example be exchanged. If the centrifugal pump part 3099 for example is used as a blood pump then the centrifugal pump part 3099 can be configured as a single use product. When in this way the centrifugal pump part 3099 is replaced after each application, the drive apparatus can be used for an arbitrary frequent duration for the drive of the centrifugal wheel 303*b* arranged in the centrifugal pump part 3099. The centrifugal wheel 302*b* is held in a levitating manner contactless by the stator 307 and the magnetically acting forces, as soon as the centrifugal pump part 3099 is arranged in the predefined position in the stator 307. Through the forces acting passively and in a stabilizing and/or restoring manner on the position of the rotor 302, this can be stored contactless in the stator 307 and respectively in the housing 309 with respect to all six degrees of freedom. In this connection it should be noted that the magnetic forces acting in a stabilizing manner purely in a passive sense on the position of the rotor part 301 is of relatively small amount, in particular the force in the axial direction z is of relatively small amount. Having regard to larger forces acting in the z direction of the centrifugal wheel 302*b* this would be lifted off with respect to the stator 307 or the rotor 302 respectively would touch the housing 309 of the centrifugal pump part 3099. The centrifugal pump parts 3099 are configured in such a way that the forces acting in the z direction at the rotor 302 are reduced in order to also store the rotor 302 during the conveyance of a fluid F in a contactless manner in the housing 309.

The rotor part 301 can be configured as a ring-shaped body or as a disc shaped body. With the criterion "disc-shaped body" in the most cases meaning that the thickness, this means the height of the rotor, is smaller than half the diameter of the rotor having regard to a bearing-free motor, as then the rotor can be stabilized magnetically with respect to tilts.

FIG. 8C shows a longitudinal section along the line B-B of a centrifugal pump part 3099 in accordance with FIG. 8B having a pump inlet opening 30101 extending in z direction. The centrifugal pump part 3099 has a housing 309 having a rotor 302 arranged within the housing 309. The housing 309 is preferably closed in a liquid-tight and gas-tight manner and has a pump inlet opening 30101, as well as a pump outlet opening 30102 extending in the radial direction with respect to the rotor 302. The rotor 302 comprises a permanently magnetized rotor part 301 of ring-like design, a rotor jacket 301*a* surrounding the rotor part 301, as well as a plurality of vanes 301*b* arranged uniformly distributed over the circumference of the rotor 302 which vanes form an impeller.

The fluid F flowing in the direction F1 in the region of the pump inlet opening 30101 has a pressure p1. A constriction 30101 is arranged subsequent to the pump inlet opening 30101, which constriction acts as a nozzle in such a way that the fluid F has an increased flow velocity after passing the nozzle. The fluid F is conveyed in the direction F2 through the pump outlet opening 30102 and at a pressure p3 into a subsequent non-illustrated guide means.

Figure 8D:
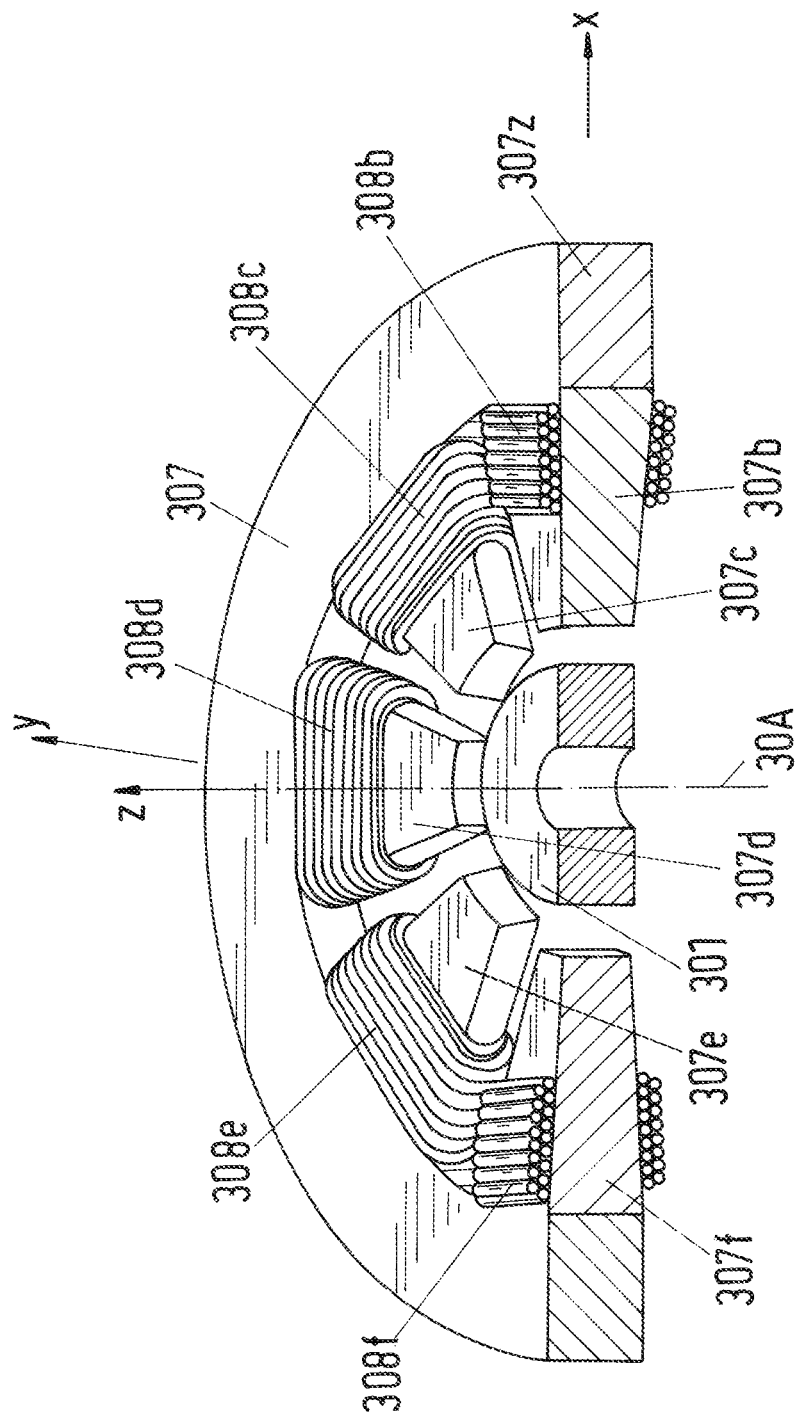
FIG. 8D is a section through a stator and a magnetically effective rotor part of the axial or centrifugal pump in accordance with FIG. 8A or FIG. 8B.

FIG. 8D shows a perspective view of a section through a stator 307 as well as a magnetically effective rotor part 301 of the rotational pump configured as an axial pump 303*a* in accordance with FIG. 8A or as a centrifugal pump 303*b* in accordance with FIGS. 8B and 8C. Having regard to the electric rotational drive discussed in this example, it is a specific embodiment of the completely magnetically stored electric rotational machine in accordance with WO 9631934 A1 that is described only by way of example and as a representative for further bearing-free motors of the class in accordance with WO 9631934 A1 that have been established in the meantime in many technical applications and are well known in numerous variants to the person of ordinary skill in the art and can likewise advantageously be used in a flow regulator in accordance with the invention. The magnetically non-effective parts of the rotational pump, such as the housing 309 or the rotor jacket 301*a* and the vanes 301*b* are not illustrated for a better understanding of the arrangement. The stator 307 has a ring-shaped part configured as a return core 307*z* at which the teeth 307*b*, 307*c*, 307*d*, 307*e*, 307*f* are arranged extending in the radial direction. The return core 7*z* as well as the teeth 7*b*, 7*c*, 7*d*, 7*e*, 7*f* are composed of a ferromagnetic metal. The magnetically effective rotor part 301 of ring shape is composed of a permanent magnet polarized in the radial direction. The coils 308*b*, 308*c*, 308*d*, 308*e*, 308*f* have two part windings configured as controllable independent of one another, wherein the one part winding is configured as a drive winding, e.g. having a pole pair number p and the other part winding is configured as a control winding e.g. having a pole pair number of p+1 or p−1. The drive winding and the magnetic active part of the rotor 301 act together comparable to a synchronizing machine in that a magnetic rotary field is generated with the drive winding in the stator 307 configured as two phase which rotary field follows the rotor 301 in such a way that the rotor 301 is driven in a rotary manner about its axis 30A. The position of the rotor 301 is detected with non-illustrated position sensors and the control winding configured as three phase is controlled under consideration of the magnetic field generated by the drive coil in such a way that the rotor 301 is held in a plane perpendicular to the axis 30A and for this reason is held in the x and y direction contactless in the stator 307. The rotor 301 is thus actively controllable with respect to three degrees of freedom, namely the position in the x direction and the y direction as well as the rotation about the axis 30A.

It is naturally understood that the embodiments discussed in the framework of this application should be understood merely by way of example and in particular also all suitable combinations and simple further developments well known to the person of ordinary skill in the art are covered by the invention.

What is claimed is:

1. A flow regulator for setting a predefinable volume flow of a fluid, comprising:
   a first sensor configured to determine a first actual value of a first flow parameter of the fluid;
   a pre-pressure regulator configured to set a predefinable pre-pressure at a pre-pressure outlet of the pre-pressure regulator; and
   a regulating pump in the form of a rotary pump,
   the fluid capable of being supplied to the pre-pressure regulator at a plant pressure in an operating state via an inflow line and a pre-pressure inlet and capable of being conducted further to the regulating pump at the pre-pressure via a flow connection disposed between the pre-pressure outlet and the regulating pump, the pre-pressure outlet being connected to a high pressure connection of the regulating pump in a flow communicating manner via the flow connection such that the fluid is capable of being supplied from the pre-pressure regulator of the regulating pump and guided away from the regulating pump via a low pressure connection into an outflow line, a speed of rotation of the regulating pump capable of being set by a regulating control using a first desired value in dependence on the first actual value of the first flow parameter such that a limiting pressure acting against the pre-pressure is capable of being produced by the regulating pump so that the predefinable volume flow of the fluid is set in the outflow line.

2. A flow regulator in accordance with claim 1, wherein the first sensor is a first through-flow sensor and the first flow parameter is a fluid flow of the Fluid.

3. A flow regulator in accordance with claim 1, wherein the first sensor is a first pressure sensor and the first flow parameter is a fluid pressure in the fluid.

4. A flow regulator in accordance with claim 1, wherein the first sensor is disposed at the outflow line downstream of the low pressure connection of the regulating pump.

5. A flow regulator in accordance with claim 1, wherein the first sensor is disposed at the flow connection between the pre-pressure regulator and the regulating pump.

6. A flow regulator in accordance with claim 1, wherein an additional pump is disposed at the outflow line as a booster pump.

7. A flow regulator in accordance with claim 6, wherein a second sensor configured to determine a second actual value of a second flow parameter of the fluid is disposed at the outflow line downstream of the additional pump such that a speed of rotation of the additional pump is capable of being controlled or regulated by an additional control using a second desired value in dependence on the second current actual value of the second flow parameter, such that the predefinable volume flow of the fluid is capable of being set in the outflow line.

8. A flow regulator in accordance with claim 7, wherein the second sensor is a second through-flow sensor and, for setting the volume flow, the regulating control and the additional control are connected in parallel in a signal conducting manner to the second through flow sensor for reading in the second actual value and the regulating control and the additional control are fed in parallel with a common desired value.

9. A flow regulator in accordance with claim 7, wherein the second sensor is a second pressure sensor and, for setting the volume flow, the regulating control and the additional control are connected to the second pressure sensor in parallel in a signal conducting manner for the reading in of the second actual value and the regulating control and the additional control are fed in parallel with the common desired value.

10. A flow regulator in accordance with claim 7, wherein, for setting the pre-pressure, the pre-pressure regulator is an active pre-pressure regulator, or a pre-pressure sensor is disposed at the inflow line or at the outflow connection or at the outflow line and is connected to the active pre-pressure regulator in a signal conducting manner such that the pre-pressure is capable of being actively set.

11. A flow regulator in accordance with claim 1, wherein the pre-pressure regulator is a pressure reducing unit.

12. A flow regulator in accordance with claim 7, wherein the regulating pump or the additional pump is a centrifugal pump or an axial flow pump or a side passage pump or a diagonal flow pump, or a drive of the regulating pump or of the additional pump is a bearing-free motor.

13. A flow regulator in accordance with claim 7, wherein a rotor of the regulating pump or of the additional pump comprises a permanent magnet, or the rotor of the regulating pump or of the additional pump is a flat disc rotor.

14. A flow regulator in accordance with claim 7, wherein a pump housing or a rotor of the regulating pump or of the additional pump is a single use product.

15. A flow regulator in accordance with claim 7, wherein the additional pump is a rotary pump disposed at the outflow line as a booster.

16. A flow regulator in accordance with claim 10, wherein the active pre-pressure regulator is configured to be influenced by the first sensor or by the second sensor.

17. A flow regulator in accordance with claim 11, wherein the pre-pressure regulator is one of a manual pressure regulator, a pneumatic pressure regulator, an electric pressure regulator, and a proportional valve.

18. A flow regulator in accordance with claim 7, wherein a rotor of the regulating pump or of the additional pump is a disc rotor having a height smaller than or equal to half a diameter of the disc rotor.

19. A method of setting a predefinable volume flow of a fluid by a flow regulator, comprising:
providing a flow regulator including a first sensor, a pre-pressure regulator and a regulating pump in the form of a rotary pump,
determining, with the first sensor, a first actual value of a first flow parameter of the fluid;
setting, with the pre-pressure regulator a predefinable pre-pressure at a pre-pressure outlet of the pre-pressure regulator; and
supplying the fluid being to the pre-pressure regulator at a plant pressure in an operating state via an inflow line and a pre-pressure inlet and conducted further to the regulating pump at the pre-pressure via a flow connection disposed between the pre-pressure outlet and the regulating pump, the pre-pressure outlet being connected to a high pressure connection of the regulating pump in a flow communicating manner via the flow connection so as to supply the fluid from the pre-pressure regulator of the regulating pump and be guided away from the regulating pump via a low pressure connection into an outflow line, a speed of rotation of the regulating pump capable of being set by a regulating control using a first desired value in dependence on the first actual value of the first flow parameter such that a limiting pressure acting against the pre-pressure is produced by the regulating pump so that the predefinable volume flow of the fluid is set in the outflow line; and
regulating one of a volume flow of a highly sensitive liquid, a highly pure liquid, a physically aggressive liquid or a chemically aggressive liquid, a medical liquid, a biological liquid or a pharmaceutical liquid.

20. A method of claim 19, wherein the regulating includes regulating blood or a slurry.

* * * * *